United States Patent
Zhou et al.

(10) Patent No.: US 9,365,672 B2
(45) Date of Patent: Jun. 14, 2016

(54) POLYLACTIC ACID BLOCK COPOLYMERS AND PREPARATION METHODS THEREOF

(75) Inventors: Jian Zhou, Zhejiang (CN); Peng Chen, Zhejiang (CN); Qun Gu, Zhejiang (CN); Jun Li, Zhejiang (CN); Wentao Shi, Zhejiang (CN); Zongbao Wang, Zhejiang (CN); Zhiqiang Jiang, Zhejiang (CN); Xuedong Wu, Zhejiang (CN)

(73) Assignee: Ningbo Institute of Material Technology and Engineering, Chinese Academy of Sciences, Ningbo, Zhejiang (CN)

( * ) Notice: Subject to any disclaimer, the term of this patent is extended or adjusted under 35 U.S.C. 154(b) by 245 days.

(21) Appl. No.: 13/990,541

(22) PCT Filed: Nov. 29, 2011

(86) PCT No.: PCT/CN2011/083125
§ 371 (c)(1),
(2), (4) Date: Aug. 19, 2013

(87) PCT Pub. No.: WO2012/072023
PCT Pub. Date: Jun. 7, 2012

(65) Prior Publication Data
US 2013/0324680 A1    Dec. 5, 2013

(30) Foreign Application Priority Data

Nov. 30, 2010  (CN) .......................... 2010 1 0568888
May 12, 2011   (CN) .......................... 2011 1 0122513

(51) Int. Cl.
  C08G 63/08    (2006.01)
  C08G 63/60    (2006.01)
(52) U.S. Cl.
  CPC ............... *C08G 63/08* (2013.01); *C08G 63/60* (2013.01)
(58) Field of Classification Search
  CPC ......... C08L 67/04; C08L 57/04; C08L 71/02; C08L 101/00; C08L 1/04; C08L 1/08; C08L 2201/12; C08G 81/00; C08G 63/08; C08G 63/60
  See application file for complete search history.

(56) References Cited

U.S. PATENT DOCUMENTS

| 5,202,413 | A  | * | 4/1993 | Spinu ................... C08G 18/428 525/415 |
| 5,403,897 | A  |   | 4/1995 | Ebato et al. |
| 6,420,048 | B1 | * | 7/2002 | Wang ............................ 428/480 |
| 7,094,864 | B2 | * | 8/2006 | Watanabe ..................... 528/354 |

FOREIGN PATENT DOCUMENTS

| CN | 1538979   | 10/2004 |
| CN | 101134807 | 3/2008  |
| CN | 101338025 | 1/2009  |
| CN | 102060986 | 5/2011  |
| CN | 102241811 | 11/2011 |

OTHER PUBLICATIONS

"Melt reaction and structural analysis based on poly (butylene terephthalate) and oligo(lactic acid) with addition of butanediol", Tan et al., J Therm Anal Calorim (2010) 99, pp. 269-275, published Jun. 19, 2009.

"Melting Bulk Reaction Between Poly (butylene terephthalate) and Poly(ethylene glycol)/DL-Oligo(lactic acid)", Chen et al., Wiley InterScience (www.interscience.wiley.com), Feb. 5, 2008, 9 pages.

International Search Report, from PCT/CN2011/083125, dated Mar. 15, 2012, 4 pages.

* cited by examiner

*Primary Examiner* — Ling Choi
*Assistant Examiner* — Gennadiy Mesh
(74) *Attorney, Agent, or Firm* — Hamre, Schumann, Mueller & Larson, P.C.

(57) ABSTRACT

A polylactic acid triblock copolymer and a preparation method thereof are described. The polylactic acid triblock copolymer comprises an aromatic polyester oligomer block and a polylactic acid block. The polylactic acid triblock copolymer is obtained by reacting an aromatic polyester oligomer with a monomer lactide at a desired temperature. The polylactic acid block copolymer has a regular structure indicated by peak melting temperatures (Tm) corresponding to the aromatic polyester oligomer block and the polylactic acid block, respectively. Examples of the aromatic polyester oligomer block include polyethylene terephthalate, polybutylene terephthalate, and polyethylene 1,4-naphthalate. Examples of the monomer lactide include L-lactide and D-lactide.

20 Claims, No Drawings

POLYLACTIC ACID BLOCK COPOLYMERS AND PREPARATION METHODS THEREOF

This application claims priority to Chinese Application No. 201010568888.0 filed on Nov. 30, 2010, the title of which is "Aromatic-aliphatic block copolyester and preparation method thereof", and Chinese Application No. 201110122513.6 filed on May 12, 2011, the title of which is "Polylactic Acid block copolymer and preparation method thereof", and the disclosure of two of the applications is incorporated herein by reference in its entirety.

FIELD OF INVENTION the present invention relates to the field of polylactic acid, particularly to a polylactic acid block copolymer and the preparation method thereof.

BACKGROUND OF INVENTION

People are interested in poly lactic acid (PLA) since the raw material thereof, lactic acid is derived from biological source and can be biodegraded, and PLA has the similar process ability and mechanical properties as common plastics such as PP and PE. PLA has a broad range of application and enormous market potential, however, compared with the aromatic polyesters such as PET, PLA possesses higher brittleness and poor impact resistance, which has limited its wider applications.

The properties of PLA can be improved by modification, for example, by melt-polycondensation with aromatic polyester, or by melt coupling, thereby the resulting copolymer possessing the properties of both of the two polymers. However, the melt-polycondensation should be carried out at high temperatures and under high vacuum. The reaction condition is tough, the transesterification reaction is inevitable and the distribution of each block would be random in the copolymer chains. Meanwhile, the racemization of PLA tends to occur during the melt-polycondensation, and the PLA block exists usually in amorphous form. As a result, PLA possesses poor crystallizability, even no crystallizability. In addition, PLA may be degraded under the high temperatures and high vacuum reaction condition, and the content of PLA in the product is much lower than the feedstock (Licheng Tan et al, J Therm Anal Calorim, 2010, 99:269-275; Journal of Applied Polymer Science, 2008, 108:2171-2179).

The multi-block copolymers between PLA and PET which was disclosed by Chinese patent (CN101338025A) were synthesized by coupling hydroxyl terminated PET and PLA prepolymer using diisocyanate as the coupling agent. The low melting temperature PET was firstly synthesized by introducing the long chain aliphatic diol. Then, the coupling reaction was carried out in the molten state at 140-210° C. However, since this reaction was performed by coupling method in the molten state, the product is the mixture of polymers with complex structures and is difficult to separate, it's impossible to obtain block copolymer with the definite structure.

CN101134807A has disclosed the following method: the block copolymers of PLA is synthesized via ring-opening polymerization of L-lactide under 110-180° C. in molten state with the low-melting-point hydroxyl terminated prepolymer as initiator. Because of the use of the low $T_m$ macroinitiator, this molten state polymerization reaction could be carried out under relatively lower temperature. However, all of the melting temperature of aromatic polyester such as PET, PTT, PBT, is higher than 220° C., with the $T_m$ of PET being about 260° C. Thus, if lactide ring-opening polymerization is initiated by polyester of high melting temperature such as PET, PTT, PBT under molten state, the transesterification reaction would happen, and the degradation and racemization of lactide or PLA are inevitable. Therefore, it is not feasible to synthesize the block copolymers of PLA and polyesters with higher melting temperature by melt-polycondensation.

SUMMARY OF INVENTION

Thus, the purpose of the invention is to provide a polylactic acid block copolymer and the preparation method thereof. For the synthetic method of the present invention, the reaction condition is mild, the raw material lactide and the product polylactic acid won't degrade or racemizate, and the resulting polylactic acid block copolymer possesses definite structure.

In order to solve the above technical problems, the present invention provides a polylactic acid block copolymer, which comprises block A and block B, and is presented as B-b-A-b-B triblock structure, wherein block A has the structure of formula (I):

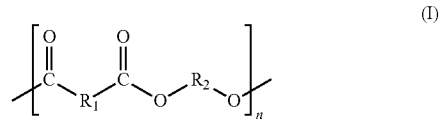

wherein $R_1$ is one or more selected from the group consisting of formula (11) to (15):

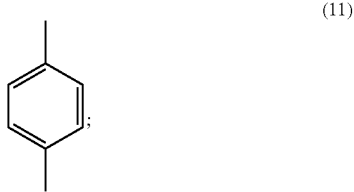

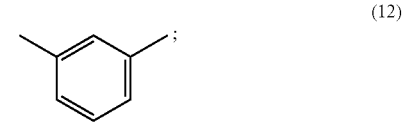

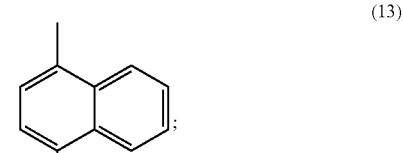

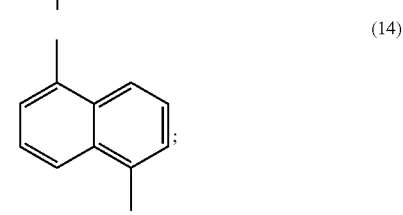

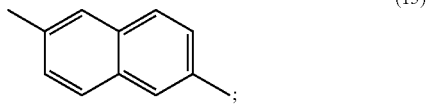

$R_2$ is one or more selected from the group consisting of $(CH_2)_2$, $(CH_2)_3$, $(CH_2)_4$, $(CH_2)_6$ and

n is a natural number;
block B has the structure of formula (II):

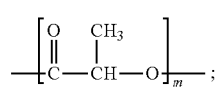

wherein the m is a natural number.

The present invention provided a polylactic acid block copolymer, which is consisted of aromatic copolymer block and polylactic acid block, and presented as B-b-A-b-B triblock structure, wherein b is an abbreviation of block that indicates that the preceding structural unit and the following structural unit are blocks.

In the polylactic acid block copolymer, said block A is aromatic polyester block, and it could be the block formed of one or more selected from the group consisting of poly ethylene terephthalate, poly ethylene isophathlate, poly ethylene 1,4-naphthalate, poly ethylene 1,5-naphthalate, poly ethylene naphthalate, poly butylene terephthalate, poly butylene isophathlate, poly butylene 1,4-naphthalate, poly butylene 1,5-naphthalate, poly butylene naphthalate, poly trimethylene terephthalate, poly trimethylene isophathlate, poly trimethylene 1,4-naphthalate, poly trimethylene 1,5-naphthalate, poly trimethylene naphthalate, poly 1,6-hexylene terephthalate, poly 1,6-hexylene isophathlate, poly 1,6-hexylene 1,4-naphthalate, poly 1,6-hexylene 1,5-naphthalate, poly 1,6-hexylene naphthalate, poly 1,4-cyclohexylene dimethylene terephthalate, poly 1,4-cyclohexylene dimethylene isophathlate, poly 1,4-cyclohexylene dimethylene 1,4-naphthalate, poly 1,4-cyclohexylene dimethylene 1,5-naphthalate and poly 1,4-cyclohexylene dimethylene 2,6-naphthalate, preferably the block formed of poly ethylene terephthalate, poly ethylene isophathlate, poly ethylene 1,4-naphthalate, poly ethylene 1,5-naphthalate, poly ethylene naphthalate, poly butylene terephthalate, poly butylene isophathlate, poly butylene 1,4-naphthalate, poly butylene 1,5-naphthalate, and poly butylene naphthalate. In said block A, n stands for the degree of polymerization of the aromatic polyester, which preferably is an integer selected from 1-200, more preferably is an integer selected from 10-180.

In the present invention, said block B is a polylactic acid block, and the monomer forming block B is one or more selected from the group consisting of meso-lactide, D,L-lactide, L-lactide and D-lactide. In block B, m stands for the degree of polymerization of the polylactic acid, which preferably is an integer selected from 30-3000, more preferably is an integer selected from 50-2800.

The polylactic acid block copolymer provided by the invention has explicit structure, and can be used to study the effects of different block structure and the content of specific block on the crystallization property as well as thermal properties of another block. Moreover, it can be used as compatilizer to study the effects on the compatibility and the mechanical performance of the relevant blend of aromatic polyester and aliphatic polyester.

A preparation method for polylactic acid block copolymer has been further provided by the invention, comprising the following steps:

Step (1): under $N_2$, an intermediate is obtained by reacting a cyclic aromatic polyester oligomer with 1,1,6,6-tetra-n-butyl-1,6-distanna-2,5,7,10-tetraoxacyclodecane in a first type of solvent; wherein the cyclic aromatic polyester oligomer is one or more selected from the group consisting of cyclic poly ethylene terephthalate, cyclic poly ethylene isophathlate, cyclic poly ethylene 1,4-naphthalate, cyclic poly ethylene 1,5-naphthalate, cyclic poly ethylene naphthalate, cyclic poly butylene terephthalate, cyclic poly butylene isophathlate, cyclic poly butylene 1,4-naphthalate, cyclic poly butylene 1,5-naphthalate, cyclic poly butylene naphthalate, cyclic poly trimethylene terephthalate, cyclic poly trimethylene isophathlate, cyclic poly trimethylene 1,4-naphthalate, cyclic poly trimethylene 1,5-naphthalate, cyclic poly trimethylene naphthalate, cyclic poly 1,6-hexylene terephthalate, cyclic poly 1,6-hexylene isophathlate, cyclic poly 1,6-hexylene 1,4-naphthalate, cyclic poly 1,6-hexylene 1,5-naphthalate, cyclic poly 1,6-hexylene naphthalate, cyclic poly 1,4-cyclohexylene dimethylene terephthalate, cyclic poly 1,4-cyclohexylene dimethylene isophathlate, cyclic poly 1,4-cyclohexylene dimethylene 1,4-naphthalate, cyclic poly 1,4-cyclohexylene dimethylene 1,5-naphthalate and cyclic poly 1,4-cyclohexylene dimethylene 2,6-naphthalate;

Step (2): a crude product is obtained by reacting the intermediate obtained in step (1) with monomer lactide in a second type of solvent;

Step (3): the crude product obtained in step (2) is dissolved in a third type of solvent, and after precipitation using methanol, the polylactic acid block copolymer is obtained.

The block copolymer provided by the present invention is obtained by copolymerization, wherein a catalyst is firstly used to initiate the synthesis of aromatic polyester of various molecular weights comprising the catalyst from cyclic aromatic polyester oligomer, and then initiate the synthesis of desired polylactic acid block copolymer from monomer lactide.

Preferably, step (1) comprises:

Under $N_2$, the cyclic aromatic polyester oligomer and 1,1,6,6-tetra-n-butyl-1,6-distanna-2,5,7,10-tetraoxacyclodecane (stannoxane as the abbreviation) are dissolved in a first type of solvent which has high boiling-point and is dehydrated and de-oxygened. The reaction is performed at 120° C.-180° C. During the process, the reaction is monitored using Gel Permeation Chromatograph (GPC). The reaction is quenched after the signal peak for cyclic aromatic polyester oligomer disappears; after the reaction is completed, the reaction mixture is cooled to room temperature, and the intermediate is obtained through filtration;

In step (1), in a first type of solvent, the ring-opening polymerization of cyclic aromatic polyester oligomer is performed in the presence of the catalyst, 1,1,6,6-tetra-n-butyl-1,6-distanna-2,5,7,10-tetraoxacyclodecane, was thereby obtaining the intermediate product, i.e., the aromatic polyester containing the catalyst; the intermediate product can be separated and obtained by cooling the reaction mixture to room temperature, since the obtained intermediate product doesn't dissolve in the first type of solvent at room temperature;

Preferably, the temperature for the ring opening polymerization of cyclic aromatic polyester oligomer is 125° C.-175° C., more preferably 130° C.-170° C.; preferably, the amount of catalyst is 0.1%-5%, more preferably, 0.5%-4%, based on the amount of cyclic aromatic polyester; preferably, the first type of solvent is one or more selected from the group consisting of o-dichlorobenzene, chlorobenzene, 1,2,4-trichlorobenzene and tetrachloroethane; preferably, the cyclic aromatic polyester oligomer is cyclic polyethylene terephthalate, cyclic poly ethylene isophathlate, cyclic poly 1,4-naphthalenediformate, cyclic poly ethylene 1,5-naphthalate, cyclic poly ethylene naphthalate, cyclic poly butylene terephthalate, cyclic poly butylene isophathlate, cyclic poly butylene 1,4-naphthalate, cyclic poly butylene 1,5-naphthalate, cyclic poly butylene naphthalate.

In particular, step (2) comprises:

the intermediate product obtained in step (1) and monomer lactide are dissolved in a second type of solvent which has high boiling-point and is dehydrated and de-oxygened, wherein the concentration of the intermediate product is less than or equal to 100 g/L, and the concentration of the monomer lactide is less than or equal to 1 kg/L; the reaction is carried out at 120° C.-160° C.; during the process, the reaction is monitored by Gel Permeation Chromatograph; the reaction is quenched after the signal peak of lactide disappears; after the reaction is completed, the reaction mixture is cooled to room temperature, and filtered, thus obtaining the crude product.

The intermediate product obtained in step (1) is the aromatic polyester containing the catalyst, and the aromatic polyester could initiate ring-opening polymerization of lactide in a second type of organic solvent, thus obtaining the crude polylactic acid block copolymer containing catalyst; in step (2), the ratio of the monomer lactide to the intermediate product obtained in step (1) may not be limited, and a person skilled in the art can select it by himself according to the specific purpose.

In step (2), preferably, the second type of organic solvent can be one or two selected from o-dichlorobenzene and tetrachloroethane; the concentration of the intermediate product obtained in step (1) is preferably less than or equal to 100 g/L, more preferably less than or equal to 80 g/L; the concentration of monomer lactide is preferably less than or equal to 1 kg/L, more preferably less than or equal to 0.8 kg/L; the lactide monomer is one or more selected from the group consisting of meso-lactide, D,L-lactide, L-lactide and D-lactide. Preferably, the lactide monomer is meso-lactide, D,L-lactide, L-lactide or D-lactide. The temperature at which the intermediate product reacts with monomer lactide is preferably 125° C.-155° C., more preferably 130° C.-150° C.

and step (3) comprises:

the crude product obtained in step (2) is dissolved in a third type of solvent, wherein the concentration of the crude product is 50-200 g/L; and the crude product is precipitated using methanol, the volume of which is 3-5 times of the third type of solvent, and then the precipitate is filtered and dried in an oven to obtain PLA block copolymer.

The crude product obtained in step (2) is purified to obtain polylactic acid block copolymer, wherein the third type of solvent was preferably one or two selected from chloroform and trifluoroacetic acid; the concentration of the crude product obtained in step (2) in the third type of solvent is preferably 50 g/L-200 g/L, more preferably 80 g/L-180 g/L; the volume of methanol is preferably 2-4 times of the volume of the third type of solvent.

In the present invention, the process of reaction could be monitored by GPC, or other methods well known by a person skilled in the art for consuming the reagents thoroughly.

Analysis, such as GPC, IR, NMR and DSC, can be applied on the polylactic acid block copolymer, after it is obtained. The results show that the product prepared according to the present invention is polylactic acid block copolymer and it has explicit structure.

Compared with the irregular aromatic polyester-polylactic acid copolymer obtained by melt phase polycondensation, the aromatic polyester-polylactic block copolymer prepared according to the present invention has explicit structure. Moreover, the reaction conditions of the present invention are moderate, thus reducing the racemization and degradation between the raw material lactide and the product polylactic acid seldom happen. Besides, the present invention can be used to study the effects of different block structure and the content thereof on the crystallization property as well as thermal properties of another block, and can be used as compatilizer to study the effects on the compatibility and the mechanical performance of the relevant blend of aromatic polyester and aliphatic polyester. The present invention adopts the stepwise polymerization method, comprising firstly initiating the polymerization of cyclic aromatic polyester oligomer, and then initiating the ring-opening polymerization of lactide in order to obtain the polylactic acid block copolymer. Compared with anionic polymerization, the synthesis according to the invention is easy and the operation is simple.

Moreover, a polylactic acid block copolymer is provided in the present invention, which comprises block A1 and block B1, and is presented as B1-b-A1-b-B1 triblock structure, wherein block A1 has the structure of formula (III):

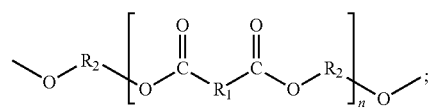
(III)

wherein $R_1$ is one or more selected from the group consisting of formula (11) to (15):

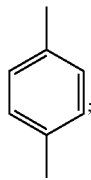
(11)

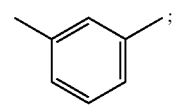
(12)

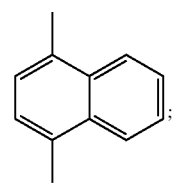
(13)

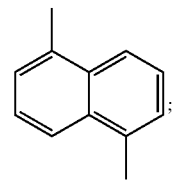
(14)

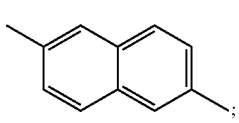

$R_2$ is one or more selected from the group consisting of $(CH_2)_2$, $(CH_2)_3$, $(CH_2)_4$, $(CH_2)_6$ and

n is a natural number;
block B1 has the structure of formula (IV):

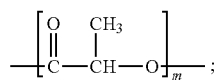

wherein m is a natural number.

The polylactic acid block copolymer provided according to the present invention consists of aromatic polyester block and polylactic acid block, and the copolymer has B1-b-A1-b-B1 tri-block structure, wherein b is an abbreviation of block that indicates that the preceding structural unit and the following structural unit are blocks. The polylactic acid block copolymer according to the invention has explicit structure and regular segments.

In the polylactic acid block copolymer provided in the present invention, A1 block is dihydroxyl terminated aromatic polyester block, which has the structure of formula (III), wherein $R_1$ is preferably one or more selected from the group consisting of formula (11), (13), (14) and (15); in formula (III), when there are more than one $R_1$ or $R_2$, the ratio can be any ratio; n represents the degree of polymerization, which is preferably a natural number selected from 1-200, more preferably 5-180.

In the polylactic acid block copolymer provided in the present invention, B1 block is polylactic acid block, and the monomer forming B1 block is one or more selected from the group consisting of racemic lactide (D,L-lactide), L-lactide and D-lactide. When block B1 is polylactic acid blocks with various types of configuration, the ratio thereof can be any ratio. In the polylactic acid block, m stands for the degree of polymerization, which preferably is a natural number selected from 30-3000, more preferably a natural number selected from 50-2800.

The present invention further provides a method for preparing polylactic acid block copolymer, comprising the following steps:

Step a): in the presence of tin salt catalyst, a first type of crude product is obtained by reacting dihydroxyl terminated aromatic polyester with a first type of monomer lactide in a first type of solvent; wherein said dihydroxyl terminated aromatic polyester has the structure of formula (V):

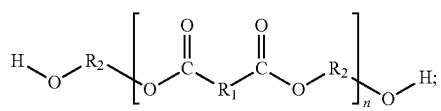

wherein $R_1$ is one or more selected from the group consisting of formula (11) to (15):

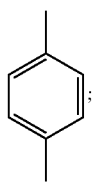

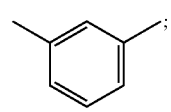

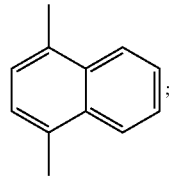

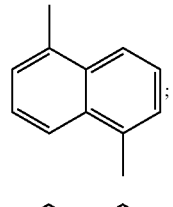

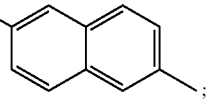

$R_2$ is one or more selected from the group consisting of $(CH_2)_2$, $(CH_2)_3$, $(CH_2)_4$, $(CH_2)_6$ and

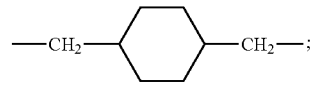

n is a natural number;

step b): the first type of crude product obtained in step a) is dissolved in a second type of solvent, and the product is precipitated using methanol, thus obtaining polylactic acid block copolymer containing polylactic acid with single configuration.

Polylactic acid block copolymer with single lactide structure is obtained after step a) and step b).

In addition to step a) and step b), the present invention can further comprise:

Step c): in the presence of tin salt catalyst, a second type of crude product is obtained by reacting the polylactic acid block copolymer obtained in step b) with a second type of monomer lactide in a third type of solvent, wherein the second type of monomer lactide is different from the first type of monomer lactide;

step d): the second type of crude product obtained in step c) is dissolved in chloroform, and the product is precipitated using methanol, thus obtaining polylactic acid block copolymer containing polylactic acid with two types of configuration.

Polylactic acid block copolymer containing polylactic acid with two type of configuration can be obtained by step a), step b), step c) and step d).

In addition to step a), step b), step c) and step d), the present invention can further comprise:

step e): in the presence of tin salt catalyst, a third type of crude product is obtained by reacting the polylactic acid block copolymer obtained in step d) with a third type of monomer lactide in a third type of solvent, wherein the third type of monomer lactide is different from the first type of monomer lactide and the second type of monomer lactide;

step f): the third type of crude product obtained in step e) is dissolved in chloroform, and the product is precipitated using methanol, thus obtaining polylactic acid block copolymer containing polylactic acid with three types of configuration.

Polylactic acid block copolymer containing polylactic acid block with three types of configuration can be obtained by step a), step b), step c), step d), step e) and step f).

According to the present invention, the solution polymerization method is used, wherein the organic solvent that can dissolve the reactants dihydroxyl terminated aromatic polyester and lactide is used as reaction medium, the tin salt is used as catalyst, and the dihydroxyl terminated aromatic polyester is used as an initiator for initiating the ring-opening polymerization of lactide in the solvent, thus effectively introducing polylactic acid block into aromatic polyester, and obtaining polylactic block copolymer. Not only the block copolymer containing polylactic acid block with single configuration, but also the block copolymer containing poly lactic acid block with two or three types of configuration can be obtained.

Preferably, step a) comprises:
the dihydroxyl terminated aromatic polyester is dried under vacuum, thus making the water content thereof less than or equal to 20 ppm; at 60° C.-130° C., the dried dihydroxyl terminated aromatic polyester and a first type of monomer lactide are dissolved in a first type of organic solvent which is dehydrated and de-oxygened; and tin salt catalyst is added and then the reaction is performed at 60° C.-150° C.; the reaction is monitored by gel permeation chromatograph (GPC); the reaction is quenched after the signal peak of the first type of monomer lactide disappears; the reaction mixture is cooled to room temperature, and filtered to obtain the first type of crude product.

In step a), tin salt is used as catalyst, and the dihydroxyl terminated aromatic polyester is used as initiator to initiate the ring-opening polymerization of the first type of lactide in organic solvent and relatively lower temperature, i.e., 60° C.-150° C., thus obtaining the first type of crude product.

In step a), the dihydroxyl terminated aromatic polyester has the structure of formula (V), wherein $R_1$ is preferably one or more selected from the group consisting of formula (11), (13), (14) and (15); in formula (III), when there is more than one type of $R_1$ or $R_2$, the ratio between them can be any ratio; n represents degree of polymerization, which is preferably a natural number selected from 1-200, more preferably a natural number selected from 5-180. The intrinsic viscosity of the dihydroxyl terminated aromatic polyester is 0.04 dL/g-1.0 dL/g, which is measured at 25° C. and in the mixed solution of phenol and tetrachloroethane with the mass ratio being 1:1.

In step a), the first type of solvent is one or more selected from the group consisting of o-dichlorobenzene, tetrachloroethane, nitrobenzene and 1,2,4-trichlorobenzene. When there is more than one kind of solvent, the ratio between each solvent can be any ratio.

In step a), the first type of monomer lactide is selected from the group consisting of L-lactide, D-lactide and D,L-lactide.

In step a), the concentration of the dihydroxyl terminated aromatic polyester in the first type of solvent is preferably no more than 100 g/L, more preferably no more than 80 g/L; the concentration of the first type of lactide in the first type of solvent is preferably no more than 2 kg/L, more preferably no more than 1.8 kg/L.

In step a), tin catalyst is preferably $Sn(Oct)_2$, $SnCl_2$, $SnCl_4$, or $SnBr_2$; the amount of tin catalyst is preferably 0.01%-1%, more preferably was 0.05%-0.8%, based on the total amount of the dihydroxyl terminated aromatic polyester and the first type of monomer lactide.

step b) comprises:
the first type of crude product obtained in step a) is dissolved in a second type of organic solvent, and is precipitated using methanol, the volume of which is 3-5 times of the second type of organic solvent, and is filtered and dried in an oven to obtain polylactic acid block copolymer with polylactic acid of single configuration;

The first type of crude product obtained in step a) is purified by method such as redissolution and precipitation, thus obtaining polylactic acid block copolymer with polylactic acid of single configuration.

In step b), the second type of organic solvent is preferably one or two selected from the group consisting of chloroform and trifluoroacetic acid, and the concentration of the first type of crude product in the second type of organic solvent is preferably 50 g/L-200 g/L, more preferably 70 g/L-180 g/L.

After obtaining the polylactic acid block copolymer with polylactic acid of single configuration, GPC, NMR and DSC analysis are applied on the block copolymer. The results show that it is polylactic acid block copolymer, and has explicit sequence as well as regular segment.

step c) comprises:
at 30° C.-140° C., the polylactic acid block copolymer obtained in step b) and a second type of monomer lactide is dissolved in a third type of organic solvent which is dehydrated and de-oxygened; tin salt catalyst is added; the reaction is monitored by gel permeation chromatograph; the reaction is quenched after the signal peak of the second type of monomer lactide disappears; the reaction mixture is cooled to room temperature, and filtered to obtain the second type of crude product.

After obtaining the block copolymer with polylactic acid of single configuration, the above block copolymer was used as initiator, and the ring-opening polymerization of the second type of monomer lactide is initiated in the third type of organic solvent in the presence of tin salt catalyst, thus obtaining the polylactic acid block copolymer with polylactic acid of two types of configuration.

In step c), the third type of organic solvent is one or more selected from the group consisting of dichloromethane, chloroform, tetrachloromethane, toluene, tetrahydrofuran, o-dichlorobenzene, and tetrachloroethane. When there is more than one solvent, the ratio of the solvents can be any ratio.

In step c), the second type of monomer lactide is L-lactide, D-lactide or D,L-lactide; and the second type of monomer lactide is different from the first type of monomer lactide in configuration.

In step c), the concentration of the polylactic acid block copolymer obtained in step b) in the third type of organic solvent is preferably no more than 300 g/L, more preferably no more than 180 g/L; and the concentration of the second type of lactide in the third type of organic solvent is preferably no more than 2 kg/L, more preferably no more than 1.8 kg/L.

In step c), the tin catalyst is preferably $Sn(Oct)_2$, $SnCl_2$, $SnCl_4$, or $SnBr_2$; the amount of the tin catalyst is 0.01-1%, more preferably 0.05-0.8%, based on the total amount of the polylactic acid block copolymer obtained in step b) and the second type of monomer lactide.

step d) comprises:

the second type of crude product obtained in step c) is dissolved in chloroform, wherein the concentration of the second type of crude product is 50 g/L-100 g/L, and the product is precipitated by using methanol, the volume of which is 3-5 times of chloroform, and then the product is filtered and dried in an oven, thus obtaining polylactic acid block copolymer with polylactic acid of two types of configuration;

The second type of crude product obtained in step c) is purified by methods such as redissolution and precipitation, thus obtaining polylactic acid block copolymer with polylactic acid of two types of configuration.

In step d), the concentration of the second type of crude product in the chloroform is preferably 50-100 g/L, more preferably 70-80 g/L.

After obtaining the polylactic acid block copolymer with polylactic acid of two types of configuration, GPC, NMR and DSC analysis are applied on the block copolymer. The results show that it is polylactic acid block copolymer, and has explicit sequence as well as regular segment.

step e) comprises:

at 30° C.-140° C., the poly lactic acid block copolymer obtained in step d) and the third type of monomer lactide are dissolved in a third type of organic solvent dehydrated and de-oxygened, and tin salt catalyst is added to conduct the reaction. The reaction is monitored by GPC, and quenched after the signal peak of the third type of lactide disappears. The reaction mixture is cooled to room temperature, and filtered to obtain the third type of crude product.

After the block copolymer with polylactic acid of two types of configuration is obtained, the block copolymer is used as initiator, and the ring-opening polymerization of the third type of monomer lactide is initiated in the third type of organic solvent in the presence of tin salt catalyst, thus obtaining polylactic acid block copolymer with polylactic acid of three types of configuration.

In step e), the third type of organic solvent is preferably one or more selected from the group consisting of dichloromethane, chloroform, tetrachloromethane, toluene, tetrahydrofuran, o-dichlorobenzene, and tetrachloroethane, and when there are more than one solvent, the ratio between each solvent can be any ratio.

In step e), the third type of monomer lactide is selected from the group consisting of L-lactide, D-lactide and D,L-lactide; and the third type of monomer lactide is different from the first type of monomer lactide and the second type of monomer lactide in configuration.

In step e), the concentration of the polylactic acid block copolymer obtained in step d) in the third type of organic solvent is preferably no more than 300 g/L, more preferably no more than 180 g/L; and the concentration of the third type of lactide in the third type of organic solvent is preferably no more than 2 kg/L, more preferably no more than 1.8 kg/L.

In step e), the tin catalyst is preferably $Sn(Oct)_2$, $SnCl_2$, $SnCl_4$, or $SnBr_2$; the amount of the tin catalyst is 0.01-1%, more preferably was 0.05-0.8%, based on the total amount of the poly lactic acid block copolymer obtained in step d) and the third type of monomer lactide.

step f) comprises:

the third type of crude product obtained in step e) is dissolved in chloroform, wherein the concentration of the third type of crude product is 50 g/L-100 g/L, and the product is precipitated by using methanol, the volume of which is 3-5 times of chloroform, and filtered and dried in an oven, thus obtaining polylactic acid block copolymer with polylactic acid of three types of configuration.

The third type of crude product obtained in step e) is purified by the methods such as redissolution and precipitation, thus obtaining polylactic acid block copolymer with polylactic acid of three types of configuration.

In step d), the concentration of the third type of crude product in the chloroform is preferably 50-100 g/L, more preferably 70-80 g/L.

After the polylactic acid block copolymer with polylactic acid of three types of configuration is obtained, GPC, NMR and DSC analysis are applied on the block copolymer. The results show that it is polylactic acid block copolymer, and has explicit sequence as well as regular segment.

The present invention use the solution polymerization method, wherein the dihydroxyl terminated aromatic polyester and lactide are dissolved in a certain amount of organic solvent, and then the catalyst is added. The dihydroxyl terminated aromatic polyester is used as an initiator to initiate the ring-opening polymerization of lactide, thus obtaining block copolymer of aromatic polyester and polylactic acid. The reaction conditions of this method are mild, therefore, the polymerization temperature cam be controlled within the range in which the polylactic acid and lactide won't degrade, even won't racemize, so as to prevent transesterification from occurring and ensure the regularity of the segment, thus obtaining block copolymer of polyester and polylactic acid including aromatic polyester of high melting-point. Moreover, the block copolymer with polylactic acid of single configuration, the block copolymer with polylactic acid of two types of configuration or the block copolymer with poly lactic acid of three types of configuration can be prepared by the method according to the present invention, thereby obtaining the block copolymer of aromatic polyester and polylactic acid of explicit sequential structure.

DETAILED DESCRIPTION OF INVENTION

The present invention will be further illustrated below with references to the specific examples. It should be understood that these examples are only to illustrate the properties and merits of the present invention but not to limit the scope of the invention.

Example 1

Step 1: The ring-opening polymerization of cyclic poly butylene terephthalate (CBT), that is, the preparation of the macrocyclic poly butylene terephthalate (PBT).

Under $N_2$, the CBT (10 g) and stannoxane catalyst (0.5 g) were loaded into a flask (100 mL) which was baked, protected under $N_2$ and cooled. The dehydrated and de-oxygened o-dichlorobenzene was added into the flask by a syringe and the concentration of monomer CBT was 2 kg/L. The reaction was carried out at 180° C. and monitored by GPC. After 10 minutes, the signal peak of CBT disappeared and the reaction was quenched. The obtained product was cooled and filtered, and washed with dried $CHCl_3$ to wash away the residual monomer CBT. The product was dried at 60° C., and the PBT containing catalyst was obtained.

Step 2: The polymerization of lactide initiated by the PBT containing catalyst.

Under $N_2$, the PBT (0.5 g) prepared in step 1 and L-lactide (5.0 g) were added into a dried and de-oxygened flask (100 mL). The solvent o-dichlorobenzene (5 mL) was charged into the flask by a syringe, and the concentration of PBT was 100 g/L, and L-lactide was 1 kg/L, respectively. The reaction was carried out at 150° C. and the reaction liquid was a homogeneous and clear solution at this temperature. The reaction was monitored by GPC, after 6 hours, the signal peak of lactide disappeared, and the reaction was quenched. Then the reaction product was cooled and filtered to obtain the crude product.

Step 3: The crude product obtained in step 2 was dissolved in 55 mL of $CHCl_3$, thereby the concentration of the product being 100 g/L, and precipitated by addition of 250 ml methanol. The final product was obtained upon filtration and drying. GPC, FTIR, $^1$H-NMR, $^{13}$C-NMR and DSC analysis are applied on the final product. The results were shown as follows:

GPC: $CHCl_3$ was used as the mobile phase, flow rate was 1 ml min$^{-1}$, and Polystyrene (PS) was used as the standard, wherein the elution curve was presented as normal distribution, $M_n$=10.1 k, $M_w$=12.8K, PDI=1.27;

FTIR: 1759 cm$^{-1}$ (stretch vibration of C=O of PLA), 1716 cm$^{-1}$ (stretch vibration of C=O of PBT), 802 cm$^{-1}$ (the characteristic signal of 1,4-substitute of benzene of PBT);

$^1$H-NMR: 8.1 ppm (H in phenyl of PBT, 4.5 ppm (H in —O—$CH_2$—$CH_2$— of PBT), 2.0 ppm (H in —O—$CH_2$—$CH_2CH_2$— of PBT), 5.1 ppm (H in —O—CH($CH_3$) O=C— of PLA), 1.6 ppm (H in —CH($CH_3$)O=C— of PLA);

$^{13}$C-NMR: 170.0 ppm (C in the C=O in the PLA), 69.2 ppm (C in methane —OCH($CH_3$)—CO in PLA), 15.7 ppm (C in methyl of —OCH($CH_3$)—CO in PLA)); 167.0 ppm (C in the C=O in PBT), 133.2 ppm (the carbon atom connected to C=O in the phenyl of PBT), 129.3 ppm (the carbon atom connected to C=O in the phenyl of PBT)), 65.4 ppm (the carbon atom of the methylene of PBT connected to the O atom), 24.6 ppm (the carbon atom of the methylene of PBT which connected to the C atom);

DSC: $T_m$ (215° C.) corresponding to PBT blocks, and $T_m$ (150° C.) corresponding to PLA blocks;

It can be concluded from the above results that the final product was the block copolymer of polybutylene terephthalate (PBT) and L-polylactic acid (PLLA), which possesses B-b-A-b-B tri-block structure, wherein, in block A, $R_1$ possesses the structure of formula (11), and $R_2$ is $(CH_2)_4$, and block B is PLLA.

Example 2

Step 1: The ring-opening polymerization of cyclic poly ethylene terephthalate (CET), which was the preparation of the macrocyclic poly ethylene terephthalate (PET).

Under $N_2$, the CET (10 g) and stannoxane catalyst (0.05 g) were loaded into a flask (100 mL) which was baked, protected under $N_2$ and cooled. The dehydrated and de-oxygened solvent chlorobenzene was charged into the flask by a syringe and the concentration of monomer CET was 1 kg/L. The reaction was carried out at 120° C. and was monitored by GPC. After 48 h, the signal of CET disappeared, and then the reaction was quenched. The system was cooled to room temperature. After that, the product was filtered and washed with dried $CHCl_3$, and the residual monomer CET was washed away. The product was vacuum dried at 60° C., and the PET containing catalyst was obtained.

Step 2: The polymerization of lactide which was initiated by the PET containing catalyst.

Under $N_2$, the PET (0.5 g) obtained in step 1 and D-lactide (0.5 g) were loaded into a 25 mL flask which was dehydrated, de-oxygened and cooled under $N_2$. The o-dichlorobenzene solvent was charged into the flask by a syringe, so that the concentration of PET and D-lactide was both 50 g/L. The reaction was carried out at 120° C. and the reactants were in homogeneous and clear solution status at this temperature. The reaction was monitored by GPC, after 144 hours, the signal peak of lactide disappeared, and then the system was cooled and the product was filtered to obtain crude product.

Step 3: The crude product obtained in step 2 was dissolved in 20 mL mixed solvent of chloroform ($CHCl_3$) and trifluoroacetic acid (TFA) (v:v=4:1). The concentration was 50 g/L, and precipitated by 60 ml methanol. The final product was obtained after filtration and drying. GPC, FTIR, $^1$H-NMR, $^{13}$C-NMR and DSC analysis are applied on the final product. The results were not shown herein.

The results show that the product was the block copolymer of PET and D-polylactic acid (PDLA), and it is in B-b-A-b-B tri-block structure. Wherein, $R_1$ has the structure of formula (11) in block A, $R_2$ was $(CH_2)_2$, and block B was PDLA.

Example 3

Step 1: the ring-opening polymerization of cyclic poly butylene isophathlate, which was the preparation of the macrocyclic polybutylene isophathlate.

Under $N_2$, the cyclic poly butylene isophathlate (10 g) and stannoxane catalyst (0.1 g) were loaded into a flask (50 mL) which was baked, protected under $N_2$ and cooled. The mixed solvent of o-dichlorobenzene and chlorobenzene of which V:V=2:1 was charged into the flask by a syringe and the concentration of monomer cyclic poly butylene isophathlate was 2 kg/L. The reaction was carried out at 180° C. and was monitored by GPC. After 10 minutes, the signal of cyclic butylene isophathlate disappeared, and then the reaction was quenched. The system was cooled to room temperature. After that, the product was filtered and washed with dried $CHCl_3$, and the un-reacted monomer was washed away. The product was vacuum dried at 60° C., and the polybutylene isophathlate containing catalyst was obtained.

Step 2: the polymerization of lactide which was initiated by the poly butylene isophathlate containing catalyst.

Under $N_2$, the poly butylene isophathlate (0.3 g) obtained in step 1 and D,L-lactide (0.6 g) were loaded into a 25 mL flask which was dried, de-oxygened and cooled under $N_2$. The dehydrated and de-oxygened tetrachloroethane (TCE) (10 mL) was charged into the flask by a syringe, so that the concentration of poly butylene isophathlate was 100 g/L, and the concentration of L-lactide 200 g/L. The reaction was carried out at 160° C. and the reactants were in homogeneous and clear solution status under this temperature. The reaction was monitored by GPC, after 24 hours, the signal of D,L-lactide disappeared. Then the system was cooled and the product was filtered to obtain crude product.

Step 3: The crude product obtained in step 2 was dissolved in 10 mL mixed solvent of $CHCl_3$ and TFA (v:v=4:1). The concentration of crude product was 90 g/L and precipitated by 50 ml methanol. The final product was obtained after filtration and dried. GPC, FTIR, $^1$H-NMR, $^{13}$C-NMR and DSC analysis were applied on the final product. The results were not shown herein.

The results show that the product was the block copolymer of polybutylene isophathlate and racemized polylactic acid, and it is in B-b-A-b-B tri-block structure. Wherein, $R_1$ was the structure of formula (12) in block A, $R_2$ was $(CH_2)_4$, and block B was racemized polylactic acid.

Example 4

Step 1: the ring-opening polymerization of cyclic poly ethylene isophathlate, which was the preparation of the macrocyclic poly ethylene isophathlate containing catalyst.

Under $N_2$, cyclic poly ethylene isophathlate (10 g) and stannoxane catalyst (0.03 g) were loaded into a flask (50 mL)

which was baked, protected under N$_2$ and cooled. The mixed dehydrated and de-oxygened of o-dichlorobenzene and TCE (V:V=1) was charged into the flask by a syringe and the concentration of monomer cyclic poly ethylene isophathlate was 1 kg/L. The reaction was carried out at 120° C. and was monitored by GPC. After 48 h, the signal peak of monomer disappeared and the reaction was quenched. The system was cooled to room temperature. After that, the product was filtered and washed with dehydrated CHCl$_3$ to remove the un-reacted monomer. The product was vacuum dried at 60° C., thus obtaining poly (ethylene isophathlate) containing catalyst.

Step 2: the polymerization of lactide which was initiated by the polyethylene isophathlate containing catalyst.

Under N$_2$, the polyethylene isophathlate (0.3 g) and D-lactide (0.9 g) were loaded into a dried and de-oxygened 25 mL flask. The mixed dehydrated and de-oxygened o-dichlorobenzene and TCE (V:V=1.3 mL) was charged into the flask by a syringe, and the concentration of poly (ethylene isophathlate) was 100 g/L, and D-lactide was 300 g/L, respectively. The reaction was carried out at 120° C. and the reactants were in homogeneous and clear solution status under this temperature. The reaction was monitored by GPC, after 120 h, the signal of D-lactide nearly disappeared. Then the system was cooled and the product was filtered to obtain crude product.

Step 3: The crude product obtained in step 2 was dissolved in 6 mL mixed solvent of CHCl$_3$ and TFA (v:v=6:1). The concentration was 200 g/L, and precipitated by 30 ml methanol. The final product was obtained after filtration and dried. GPC, FTIR, $^1$H-NMR, $^{13}$C-NMR and DSC analysis were applied on the final product. The results were not shown.

The results show that the product was the block copolymer of poly (ethylene isophathlate) and PDLA, and it is in (B-b-A-b-B) tri-block structure. Wherein R$_1$ own the structure of (12) in block A, R$_2$ was (CH$_2$)$_2$; and block B was PDLA.

Example 5

Step 1: the ring-opening polymerization of cyclic poly butylene naphthalate (CBN), which was the preparation of the macrocyclic polybutylene naphthalate (PBN).

Under N$_2$, the CBN (10 g) and stannoxane catalyst (0.1 g) were loaded into a flask (200 mL) which was baked, protected under N$_2$ and cooled. Dehydrated and de-oxygened 1,2,4-trichlorobenzene was charged into the flask by a syringe as the solvent and the concentration of monomer CBN was 200 g/L. The reaction was carried out at 160° C. and was monitored by GPC. After 2 h, the signal of CBN disappeared, and then the reaction was stopped. The system was cooled to room temperature. After that, the product was filtered and washed with dried CHCl$_3$ to remove the un-reacted monomer. The product was dried at 60° C., and the PBN containing catalyst was obtained.

Step 2: the polymerization of lactide which was initiated by the PBN containing catalyst.

Under N$_2$, the PBN (0.5 g) obtained in step 1 and meso-lactide (1.0 g) were loaded into a 25 mL flask which was dried, de-oxygened and cooled under N$_2$. The mixed solvent of o-dichlorobenzene and TCE (V:V=2, 10 mL) was charged into the flask by a syringe, so that the concentration of PBN was 50 g/L and the concentration of meso-lactide was 100 g/L, respectively. The reaction was carried out at 140° C. and the reactants were in homogeneous and clear solution status under this temperature. The reaction was monitored by GPC, after 12 h, the signal peak of meso-lactide disappeared. Then the system was cooled and the product was filtered to obtain crude product.

Step 3: The crude product obtained in step 2 was dissolved in 8 mL mixed solvent of CHCl$_3$ and TFA (v:v=4:1). The concentration was 190 g/L and precipitated by addition to 30 ml methanol. The final product was obtained after filtration and dried. GPC, FTIR, $^1$H-NMR, $^{13}$C-NMR and DSC analysis were applied on the final product. The results were not shown.

The results show that the product was the block copolymer of PBN and PD,LLA, and it is in (B-b-A-b-B) tri-block structure. Wherein R$_1$ own the structure of (15) in block A, R$_2$ was (CH$_2$)$_4$, and block B was PD,LLA.

Example 6

Step 1: the ring-opening polymerization of cyclic Poly butylene 1,5-naphthalate, which was the production of the macrocyclic polybutylene 1,5-naphthalate.

Under N$_2$, the cyclic Poly butylene 1,5-naphthalate (10 g) and stannoxane catalyst (0.1 g) were loaded into a flask (100 mL) which was baked, protected under N$_2$ and cooled. The mixed dehydrated and deoxygened chlorobenzene and TCE (V:V=3) was charged into the flask by a syringe and the concentration of cyclic Poly butylene 1,5-naphthalate monomer was 500 g/L. The reaction was carried out at 180° C. and was monitored by GPC. After 20 minutes, the signal of cyclic monomer disappeared, and then the reaction was quenched. The system was cooled to room temperature. After that, the product was filtered and washed with dried CHCl$_3$ to remove the un-reacted monomer. The product was vacuum dried at 60° C., and the polybutylene 1,5-naphthalate containing catalyst was obtained.

Step 2: the polymerization of lactide which was initiated by the poly butylene 1,5-naphthalate containing catalyst.

Under N$_2$, the polybutylene 1,5-naphthalate (20 g) obtained in step 1 and D,L-lactide (10 g) were loaded into a 250 mL flask which was dehydrated, de-oxygened and cooled under N$_2$. The solvent of dehydrated TCE (100 mL) was charged into the flask by a syringe, so that the concentration of polybutylene 1,5-naphthalate was 200 g/L and the concentration of D,L-lactide was 100 g/L, respectively. The reaction was carried out at 160° C. The reaction was monitored by GPC, after 4 h, the signal of D,L-lactide disappeared. Then the system was cooled and the product was filtered to obtain crude product.

Step 3: The crude product obtained in step 2 was dissolved in 300 mL mixed solvent of CHCl$_3$ and TFA (v:v=1:1). The concentration was 100 g/L and precipitated by addition to 900 ml methanol. The final product was obtained after filtration and dried. GPC, FTIR, $^1$H-NMR, $^{13}$C-NMR and DSC analysis were applied on the final product. The results were not shown herein.

The results show that the product was the block copolymer of poly butylene 1,5-naphthalate and PD,LLA, and it is in (B-b-A-b-B) tri-block structure. Wherein R$_1$ has the structure of (14) in block A, R$_2$ was (CH$_2$)$_4$, and block B was PD,LLA.

Example 7

Step 1: the ring-opening polymerization of cyclic poly ethylene 1,5-naphthalate, which was the preparation of the macrocyclic polyethylene 1,5-naphthalate.

Under N$_2$, the cyclic poly ethylene 1,5-naphthalate (10 g) and stannoxane catalyst (0.04 g) were loaded into a flask (50 mL) which was baked, protected under N$_2$ and cooled. The mixed dehydrated and deoxygened TCE was charged into the flask by a syringe and the concentration of monomer cyclic poly ethylene 1,5-naphthalate was 1 kg/L. The reaction was carried out at 120° C. and was monitored by GPC. After 48 h, the signal of monomer disappeared, and then the reaction was quenched. The system was cooled to room temperature. After that, the product was filtered and washed with dried $CHCl_3$ to remove the un-reacted monomer. The product was dried at 60° C., and the poly ethylene 1,5-naphthalate containing catalyst was obtained.

Step 2: the polymerization of lactide which was initiated by the polyethylene 1,5-naphthalate containing catalyst.

Under $N_2$, the polyethylene 1,5-naphthalate (30 g) obtained in step 1 and meso-lactide (10 g) were loaded into a 250 mL flask which was dried, de-oxygened and cooled under $N_2$. The solvent of TCE (300 mL) was charged into the flask by a syringe, so that the concentration of poly (ethylene 1,5-naphthalate) was 100 g/L and the concentration of meso-lactide was 33 g/L, respectively. The reaction was carried out at 160° C. The reaction was monitored by GPC, after 4 h, the signal of meso-lactide disappeared. Then the system was cooled and the product was filtered to obtain crude product.

Step 3: The crude product obtained in step 2 was dissolved in 200 mL TFA. The concentration was 200 g/L and precipitated by addition to 800 ml methanol. The final product was obtained after filtration and dried. GPC, FTIR, $^1$H-NMR, $^{13}$C-NMR and DSC analysis were applied on the final product. The results were not shown.

The results show that the product was the block copolymer of polyethylene 1,5-naphthalate and PD,LLA, and it is in (B-b-A-b-B) tri-block structure. Wherein $R_1$ has the structure of (14) in block A, $R_2$ was $(CH_2)_2$, and block B was PD,LLA.

Example 8

Step 1: the ring-opening polymerization of cyclic poly ethylene naphthalate (CEN), which was the preparation of the macrocyclic polyethylene naphthalate (PEN).

Under $N_2$, the CEN (10 g) and stannoxane catalyst (0.03 g) were loaded into a flask (50 mL) which was baked, protected under $N_2$ and cooled. The mixed dehydrated and de-oxygened trichlorobenzene, o-dichlorobenzene, and chlorobenzene (V:V:V=1:1:1) was charged into the flask by a syringe and the concentration of monomer CEN was 1 kg/L. The reaction was carried out at 160° C. and was monitored by GPC. After 2 h, the signal of CEN disappeared, and then the reaction was quenched. The system was cooled to room temperature. After that, the product was filtered and washed with dried $CHCl_3$ to remove the un-reacted monomer. The product was dried at 60° C., and the PEN containing catalyst was obtained.

Step 2: the polymerization of lactide which was initiated by the PEN containing catalyst.

Under $N_2$, the PEN (10 g) obtained in step 1 and meso-lactide (5 g) were loaded into a 200 mL flask which was dried, de-oxygened and cooled under $N_2$. The TCE solvent (100 mL) was charged into the flask by a syringe, so that the concentration of PEN was 100 g/L and the concentration of meso-lactide was 50 g/L. The reaction was carried out at 160° C. and was monitored by GPC, after 2 h, the signal peak of meso-lactide disappeared. Then the system was cooled and the product was filtered to obtain crude product.

Step 3: The crude product obtained in step 2 was dissolved in mixed solvent of $CHCl_3$ and TFA (v:v=1:2, 150 ml). The concentration was 100 g/L and precipitated by 450 ml methanol. The final product was obtained after filtration and dried. GPC, FTIR, $^1$H-NMR, $^{13}$C-NMR and DSC analysis were applied on the final product. The results were not shown.

The results show that the product was the block copolymer of PEN and PD,LLA, and it is in B-b-A-b-B tri-block structure. Wherein, $R_1$ was the structure of formula (15) in block A, $R_2$ was $(CH_2)_2$, and block B was PD,LLA.

Example 9

Step 1: the ring-opening polymerization of cyclic poly ethylene 1,4-naphthalate, which was the preparation of the macrocyclic polyethylene 1,4-naphthalate.

Under $N_2$, the cyclic poly ethylene 1,4-naphthalate (10 g) and stannoxane catalyst (0.01 g) were loaded into a flask (50 mL) which was baked, protected under $N_2$ and cooled. The mixed dehydrated and de-oxygened o-dichlorobenzene, chlorobenzene, and TCE (V:V:V=2:1:1) was charged into the flask by a syringe and the concentration of monomer cyclic Poly ethylene 1,4-naphthalate was 600 g/L. The reaction was carried out at 120° C. and was monitored by GPC. After 24 h, the signal of cyclic poly ethylene 1,4-naphthalate disappeared, and then the reaction was stopped. The system was cooled to room temperature. After that, the product was filtered and washed with dried $CHCl_3$ to remove the un-reacted monomer. The product was dried at 60° C., thus obtaining the poly ethylene 1,4-naphthalate containing catalyst.

Step 2: the polymerization of lactide which was initiated by the polyethylene 1,4-naphthalate containing catalyst.

Under $N_2$, the polyethylene 1,4-naphthalate (30 g) obtained in step 1 and L-lactide (15 g) were loaded into a 500 mL flask which was dried, de-oxygened and cooled under $N_2$. The solvent of TCE (300 mL) was charged into the flask by a syringe, so that the concentration of poly (ethylene 1,4-naphthalate) was 100 g/L and the concentration of L-lactide was 50 g/L, respectively. The reaction was carried out at 140° C. The reaction was monitored by GPC, after 4 h, the signal peak of L-lactide disappeared. Then the system was cooled and the product was filtered to obtain crude product.

Step 3: The crude product obtained in step 2 was dissolved in mixed solvent of $CHCl_3$ and TFA (v:v=1:3) 300 mL. The concentration was 150 g/L and precipitated by addition to 1000 ml methanol. The final product was obtained after filtration and dried. GPC, FTIR, $^1$H-NMR, $^{13}$C-NMR and DSC analysis were applied on the final product. The results were not shown.

The results show that the product was the block copolymer of poly (ethylene 1,4-naphthalate) and PLLA, and it is in (B-b-A-b-B) tri-block structure. Wherein $R_1$ was the structure of (13) in block A, $R_2$ was $(CH_2)_2$, and block B was PLLA.

Example 10

Step 1: the ring-opening polymerization of cyclic poly butylene 1,4-naphthalate, which was the preparation of the macrocyclic poly butylene 1,4-naphthalate.

Under $N_2$, the cyclic poly butylene 1,4-naphthalate (10 g) and stannoxane catalyst (0.2 g) were loaded into a flask (100 mL) which was baked, protected under $N_2$ and cooled. The mixed dehydrated and de-oxygened o-dichlorobenzene and TCE (V:V=5:1) was charged into the flask by a syringe and the concentration of monomer was 300 g/L. The reaction was carried out at 120° C. and was monitored by GPC. After 24 h, the signal peak of cyclic poly butylene 1,4-naphthalate disappeared, and then the reaction was stopped. The system was cooled to room temperature. After that, the product was filtered and washed with dried $CHCl_3$ to remove the un-reacted monomer. The product was dried at 60° C., thus obtaining the poly butylene 1,4-naphthalate containing catalyst.

Step 2: the polymerization of lactide which was initiated by the poly butylene 1,4-naphthalate containing catalyst.

Under $N_2$, the poly butylene 1,4-naphthalate (40 g) obtained in step 1 and meso-lactide (10 g) were loaded into a 1000 mL flask which was dried, de-oxygened and cooled under $N_2$. The mixed solvent of o-dichlorobenzene and TCE (v:v=5:1, 500 mL) was charged into the flask by a syringe, so that the concentration of poly butylene 1,4-naphthalate was 80 g/L and the concentration of meso-lactide was 20 g/L, respectively. The reaction was carried out at 150° C. The reaction was monitored by GPC, after 3 h, the signal peak of meso-lactide disappeared. Then the system was cooled and the product was filtered to obtain crude product.

Step 3: The crude product obtained in step 2 was dissolved in mixed solvent of $CHCl_3$ and TFA (v:v=1:3, 500 mL). The concentration was 100 g/L and precipitated by 2500 mL methanol. The final product was obtained after filtration and dried. GPC, FTIR, $^1$H-NMR, $^{13}$C-NMR and DSC analysis were applied on the final product. The results were not shown.

The results show that the product was the block copolymer of poly butylene 1,4-naphthalate and PD,LLA, and it is in (B-b-A-b-B) tri-block structure. Wherein $R_1$ was the structure of (13) in block A, $R_2$ was $(CH_2)_4$, and block B was PD,LLA.

Example 11

Synthesis of block copolymer of poly butylene terephthalate (PBT) and polylactic acid (PLA), the specific method was as follows:

Step 1: Polymerization of lactide initiated by dihydroxyl terminated PBT.

Under $N_2$, the vacuum dried dihydroxyl terminated PBT (0.06 g) of which the water content was 20 ppm and the intrinsic viscosity is 0.12 dL/g, and L-lactide (1.0 g) were loaded into a 50 mL flask which was dried and de-oxygened. The dehydrated TCE (2 mL) was charged into the flask by a syringe, and the concentration of PBT was 30 g/L so that the concentration of L-lactide was 0.5 kg/L, respectively. Then, the mixture was heated to 120° C. and the mixture were in homogeneous and clear solution status. After that, 0.0106 g $Sn(Oct)_2$ was added by a syringe. The reaction was carried out at 120° C. and it was monitored by GPC. After 6 h, the signal of lactide disappeared, and then the reaction was quenched. The system was cooled to room temperature. The white crude product was obtained after filtration.

Step 2: The crude product was dissolved with $CHCl_3$ (10 mL) and the concentration was 100 g/L. Then, it was precipitated by 40 ml methanol. The product was filtered and dried under vacuum to obtain terminal product, and the yield was 95.8%. Then, GPC, FTIR, $^1$H-NMR, $^{13}$C-NMR and DSC analysis are applied on the final product. The results were as follows:

GPC: $CHCl_3$ as the mobile phase, flow rate of 1 ml min$^{-1}$, the elution curve present as normal distribution; Polystyrene as the standards, and $M_n$=10.1 k, $M_w$=15.2K, PDI=1.51;

$^1$H-NMR: 8.1 ppm (H in phenyl of PBT), 4.5 ppm (H in —O—$CH_2$—$CH_2$— of PBT), 2.0 ppm (H in —O—$CH_2$—$CH_2$—$CH_2$—$CH_2$ of PBT), 5.1 ppm (H in —O—CH($CH_3$)O=C— of PLA), 1.6 ppm (H in —CH($CH_3$)O=C— of PLA); there is no signal ascribed to transesterification reaction. The weight ratio was calculated from the integrals: $m_{PBT}$:$m_{PLA}$=1:16;

$^{13}$C-NMR: 170.0 ppm (C in the C=O in the PLA), 69.2 ppm (C in methane —OCH($CH_3$)—CO in PLA), 15.7 ppm (C in methyl of —OCH($CH_3$)—CO in PLA)); 167.0 ppm (C in the C=O in PBT), 133.2 ppm (the carbon atom connected to C=O in the phenyl of PBT), 129.3 ppm (the carbon atom connected to C=O in the phenyl of PBT)), 65.4 ppm (the carbon atom of the methylene of PBT connected to the O atom), 24.6 ppm (the carbon atom of the methylene of PBT which connected to the C atom);

DSC: (the peaks of) $T_m$ (215° C.) were ascribed to PBT blocks, and $T_m$ (160° C.) were ascribed to PLA blocks;

There is only a single peak in the GPC curve, and there is no peak of transesterification reaction in NMR Spectrum, which indicates that the product is the block copolymer. In addition, there are melting peaks of two different blocks in the DSC curves which also indicates that the copolymer has block structure.

It can be concluded from the above results that the product obtained in the present example was the tri-block copolymer of PBT and PLLA, and it is in B1-b-A1-b-B1 tri-block structure. $R_1$ was the structure of formula (11) in block A1, $R_2$ was $(CH_2)_4$, and block B1 was PLLA.

Example 12

Synthesis of block copolymer of poly trimethylene terephthalate (PTT) and polylactic acid (PLA), the specific methods was as follows:

Step 1: Polymerization of lactide initiated by dihydroxyl terminated PTT.

Under $N_2$, dihydroxyl terminated PTT (0.06 g) dried under of vacuum, the water content of which was 15 ppm and the intrinsic viscosity of which is 0.04 dL/g, and D-lactide (1.0 g) were loaded into a 100 mL flask which was dried and de-oxygened. The dehydrated o-dichlorobenzene (2 mL) was charged into the flask by a syringe, the concentration of PTT was 30 g/L and D-lactide was 0.5 kg/L, respectively. Then, the mixture was heated to 60° C. and the mixture were in homogeneous and clear solution status. After that, 0.0106 g $SnCl_2$ was added by a syringe. The reaction was carried out at 60° C. and it was monitored by GPC. After 24 h, the signal of L-lactide disappeared, and then the reaction was quenched. The system was cooled to room temperature. The white crude product was obtained after filtration.

Step 2: The crude product was dissolved with $CHCl_3$ (20 mL) and the concentration was 50 g/L. Then, it was precipitated by 60 ml methanol. The product was filtered and dried under vacuum to obtain terminal product, and the yield was 96.0%. GPC, FTIR, $^1$H-NMR, $^{13}$C-NMR and DSC analysis are applied on the final product. The results were as follows:

GPC: $CHCl_3$ as the mobile phase, flow rate of 1 ml min$^{-1}$, the elution curve resent as normal distribution; Polystyrene as the standards, $M_n$=8.9 k, $M_w$=12.7K, PDI=1.43;

$^1$H-NMR: 8.19 ppm (H in phenyl of PTT), 4.7 ppm (H in —O—$CH_2$—$CH_2$—$CH_2$—O— of PTT), 2.46 ppm (H in —O—$CH_2$—$CH_2CH_2$— of PTT), 5.1 ppm (H in —O—CH($CH_3$)O=C— of PLA), 1.6 ppm (H in —CH($CH_3$)O=C— of PLA); there is no signal ascribed to transesterification reaction. The weight ratio was calculated from the integrals: $m_{PTT}$:$m_{PLA}$=1:16;

$^{13}$C-NMR: 170.0 ppm (C in the C=O in the PLA), 69.2 ppm (C in methane —OCH($CH_3$)—CO in PLA), 15.7 ppm (C in methyl-OCH($CH_3$)—CO in PLA)); 168.6 ppm (C in the C=O in PTT), 133.2 ppm ($C_1$, $C_4$ in the phenyl of PTT), 129.4 ppm ($C_2$, $C_3$, $C_5$, $C_6$ in the phenyl of PTT), 63.0 ppm (—O—$CH_2$—$CH_2$—$CH_2$—O— in the methylene of PTT), 26.8 ppm (—O—$CH_2$—$CH_2$—$CH_2$—O— in the methylene of PTT), there is no signal ascribed to transesterification reaction;

DSC: (the peaks of) $T_m$ (212° C.) were ascribed to PTT blocks, and $T_m$ (173° C.) were ascribed to PLA blocks;

There is only a single peak in the GPC curve, and there is no peak of transesterification reaction in NMR Spectrum, which indicates that the product is the block copolymer.

It can be concluded from the above results that the product obtained in the present example was the block copolymer of PTT and PDLA, and it is in B1-b-A1-b-B1 tri-block structure. $R_1$ was the structure of formula (11) in block A1, $R_2$ was $(CH_2)_3$, and block B1 was PDLA.

Example 13

Synthesis of block copolymer of PET and PLA, the specific method was as follows:

Step 1: Polymerization of lactide initiated by dihydroxyl terminated PET.

Under $N_2$, the dihydroxyl terminated PET (0.06 g) dried under vacuum, the water content of which was 10 ppm and the intrinsic viscosity of which is 1.0 dL/g and D-lactide (1.0 g), was loaded into a 100 mL flask which was dried and de-oxygened. The dehydrated mixed solvent of TCE and o-dichlorobenzene (V:V=1:2 mL) was charged into the flask by a syringe, and the concentration of PET and D-lactide was 30 g/L and 0.5 kg/L, respectively. Then, the mixture was heated to 120° C. and the mixture were in homogeneous and clear solution status. After that, 0.0106 g $SnBr_2$ was added and the reaction was carried out at 130° C. and it was monitored by GPC. After 5 h, the signal of D-lactide nearly disappeared, and then the reaction was stopped. The system was cooled to room temperature. The white crude product was obtained after filtration.

Step 2: the crude product was dissolved with $CHCl_3$ (20 mL) and the concentration was 50 g/L. Then, it was precipitated by 100 ml methanol. The product was filtered and dried under vacuum to obtain terminal product, and the yield was 96.2%. GPC, FTIR, $^1$H-NMR, $^{13}$C-NMR and DSC analysis are applied on the final product. The results were as follows:

GPC: $CHCl_3$ as the mobile phase, flow rate of 1 ml $min^{-1}$, the elution curve present as normal distribution; Polystyrene as the standards, and $M_n$=23.1K, $M_w$=31.4K, PDI=1.36;

$^1$H-NMR: 7.97 ppm (H in phenyl of PET), 4.67 ppm (H of —O—$CH_2$—$CH_2$—O— of PET), 5.42 ppm (H of —O—CH($CH_3$) O=C— of PLA), 1.68 ppm (H of —CH($CH_3$) O=C— of PLA); there is no signal ascribed to transesterification reaction. The weight ratio was calculated from the integrals: $m_{PET}$:$m_{PLA}$=1:16;

$^{13}$C-NMR: 170.0 ppm (C of the C=O in the PLA), 69.2 ppm (C of methane —OCH($CH_3$)—CO in PLA), 15.7 ppm (C of methyl-OCH($CH_3$)—CO in PLA)); 168.4 ppm (C of the C=O in PET), 133.0 ppm (C1, C4 of the phenyl of PET), 129.5 ppm (C2, C3, C5, C6 of the phenyl of PET)), 63.6 ppm (—O—$CH_2$—$CH_2$—$CH_2$— of the methylene of PET), 26.8 ppm (—O—$CH_2$—$CH_2$—$CH_2$— of the methylene of PET, there is no signal ascribed to transesterification reaction;

DSC: (the peaks of) $T_m$ (245° C.) were ascribed to PET blocks, and $T_m$ (160° C.) were ascribed to PLA blocks;

There is only a single peak in the GPC curve, and there is no peak of transesterification reaction in NMR Spectrum, which indicates that the product is the block copolymer. In addition, there are melting peaks of two different blocks in the DSC curves which also indicates that the copolymer has block structure.

It can be concluded from the above results that the product obtained in the present example was the tri-block copolymer of PET and PDLA, and it is in B1-b-A1-b-B1 tri-block structure. $R_1$ was the structure of formula (11) in block A1, $R_2$ was $(CH_2)_2$, and block B1 was PDLA.

Example 14

Synthesis of block copolymer of polyethylene 1,5-naphthalate and PLA, the specific methods was as follows:

Step 1: Under $N_2$, the vacuum-dried dihydroxyl terminated polyethylene 1,5-naphthalate (1 g) of which the water content was 5 ppm and the intrinsic viscosity is 0.78 dL/g and D,L-lactide (1.0 g) were loaded into a 100 mL flask which was dried and de-oxygened. The dehydrated mixed solvent of TCE, o-dichlorobenzene, nitrobenzene, 1,2,4-trichlorobenzene (V:V:V:V=1:1:1:1, 20 mL) was charged into the flask by a syringe, and the concentration of poly (ethylene 1,5-naphthalate) was 50 g/L, and the concentration of D,L-lactide was 0.05 kg/L, respectively. Then, the mixture was heated to 130° C. and the mixture were in homogeneous and clear solution status. After that, 0.02 g $Sn(Oct)_2$ was added by a syringe and the reaction was carried out at 150° C. and it was monitored by GPC. After 3 h, the signal of lactide disappeared, and then the reaction was quenched. The system was cooled to room temperature. The white crude product was obtained after filtration.

Step 2: The crude product was dissolved with TFA (20 mL) and the concentration was 100 g/L. Then, it was precipitated by 90 ml methanol. The product was filtered and vacuum-dried, and the yield was 98.5%. GPC, FTIR, $^1$H-NMR, $^{13}$C-NMR and DSC analysis are applied on the final product. The results were as follows:

Because of the more content of the aromatic polyester, the solubility of this copolymer in $CHCl_3$ was not very good. Thus, it is dissolved by o-chlorophenol first and the concentration was 10 mg/mL, then it was diluted to 1 mg/mL by $CHCl_3$. The mobile phase was the mixture of $CHCl_3$/o-chlorophenol (10/1, v/v), the elution curve present as normal distribution; Polystyrene as the standards, and $M_n$=65.6K, $M_w$=106.1K, PDI=1.62;

$^1$H-NMR: 8.75 ppm (H4, H8 in naphthalene of polyethylene 1,5-naphthalate block), 8.05 ppm (H2, H3, H6, H7 in naphthalene), 4.71 ppm (H in —O—$CH_2$—$CH_2$—O— in the ethylene of polyethylene 1,5-naphthalate), 5.1 ppm (H in —O—CH($CH_3$)O=C— of PLA), 1.6 ppm (H in —CH($CH_3$) O=C— of PLA); there is no signal ascribed to transesterification reaction. The weight ratio was calculated from the integrals: $m_{poly\ (ethylene\ 1,5\text{-}naphthalate)}$:$m_{PLA}$=1:1;

$^{13}$C-NMR: 171.0 ppm (C in the C=O in polyethylene 1,5-naphthalate block), 126.9 ppm (C1, C5 in the naphthalene), 132.7 ppm (C2, C6 in the naphthalene), 131.4 ppm (C3, C7 in the naphthalene), 134.1 ppm (C4, C8 in the naphthalene), 66.7 ppm (—O—$CH_2$—$CH_2$—O in the ethylene of polyethylene 1,5-naphthalate block), there is no signal ascribed to transesterification reaction; 170.0 ppm (C in the C=O in the PLA), 69.2 ppm (C in methane —OCH($CH_3$)—CO in PLA), 15.7 ppm (C in methyl-OCH($CH_3$)—CO in PLA));

DSC: (the peaks of) $T_m$ (262° C.) were ascribed to polyethylene 1,5-naphthalate blocks, and there is no peak ascribed to PLA because the PD,LLA was adopted.

There is only a single peak in the GPC curve, and there is no peak of transesterification reaction in NMR Spectrum, which indicates that the product is the block copolymer.

It can be concluded from the above results that the product obtained in the present example was the tri-block copolymer of polyethylene 1,5-naphthalate and PD,LLA, and it is in B1-b-A1-b-B1 tri-block structure. $R_1$ was the structure of formula (14) in block A1, $R_2$ was $(CH_2)_2$, and block B1 was PD,LLA.

Example 15

Synthesis of the Block Copolymer of an Aromatic Polyester and PLA

The aromatic polyester is poly (ethylene 1,5-naphthalate-co-hexylene 1,5-naphthalate) coded as P ($EN_{90}$-$HN_{10}$) which contains 90 mol % PEN and 10 mol % PHN, the specific method was as follows:

Step 1: Under $N_2$, the vacuum-dried dihydroxyl terminated (0.06 g) of which the water content was 20 ppm and the intrinsic viscosity is 0.56 dL/g and D,L-lactide (3 g) were loaded into a 100 mL flask which was dried and de-oxygened. The dehydrated solvent of TCE (10 mL) was charged into the flask by a syringe, so that the concentration of P ($EN_{90}$-$HN_{10}$) was 100 g/L and the concentration of D,L-lactide was 0.3 kg/L, respectively. Then, the mixture was heated to 120° C. and the mixture were in homogeneous and clear solution status at this temperature. After that, 0.0004 g $Sn(Oct)_2$ was added by a syringe The reaction was carried out at 120° C. and it was monitored by GPC. After 3 h, the signal of lactide nearly disappeared, and then the reaction was quenched. The system was cooled to room temperature. The white crude product was obtained after filtration.

Step 2: the crude product of step (2) was dissolved by TFA (40 mL), and the concentration was 100 g/L. Then, it was precipitated by 150 ml methanol. The product was filtered and vacuum dried, and the yield was 97.5%. Then, this product was characterized by GPC, $^1$H-NMR, $^{13}$C-NMR and DSC. The results were as follows:

Because there are larger amount of P ($EN_{90}$-$HN_{10}$) the solubility of this copolymer in $CHCl_3$ was not very good. Thus, it is dissolved by o-chlorophenol first and the concentration was 10 mg/mL, then it was diluted to 1 mg/mL by $CHCl_3$. The mobile phase was the mixture of $CHCl_3$/o-chlorophenol (10/1, v/v), flow rate was 1.0 ml $min^{-1}$ and the standards was polystyrene; the elution curve presented as normal distribution, and $M_n$=25.1K, $M_w$=39.1K, PDI=1.56;

$^1$H-NMR: 8.85 ppm (H1, H5 in naphthalene of P ($EN_{90}$-$HN_{10}$)), 8.15 ppm (H3, H4, H7, H8 in naphthalene), 4.5 ppm (H1, H6 in the hexylene of P ($EN_{90}$-$HN_{10}$)), 1.7 ppm (H3, H4 in the hexylene of P ($EN_{90}$-$HN_{10}$)), 2.05 ppm (H2, H5 in the hexylene of P ($EN_{90}$-$HN_{10}$)), 4.67 ppm (H in the ethylene of P ($EN_{90}$-$HN_{10}$)), 5.1 ppm (H in —O—CH($CH_3$)O=C— of PLA), 1.6 ppm (H in —CH($CH_3$)O=C— of PLA); there is no signal ascribed to transesterification reaction. The weight ratio was calculated from the integrals: $m_{P\ (EN90-HN10)}$:$m_{PLA}$=1:2.8;

$^{13}$C-NMR: 171.0 ppm (C in the C=O in P ($EN_{90}$-$HN_{10}$) block), 126.9 ppm (C1, C5 in the naphthalene in P ($EN_{90}$-$HN_{10}$) block), 132.7 ppm (C2, C6 in the naphthalene), 131.4 ppm (C3, C7 in the naphthalene), 129.6 ppm (C4, C8 in the naphthalene ring of P ($EN_{90}$-$HN_{10}$) block), 66.7 ppm (C in the two methylene of P ($EN_{90}$-$HN_{10}$) block, 131.2 ppm (C1, C5 in the naphthalene ring of P ($EN_{90}$-$HN_{10}$) block), 132.4 ppm (C2, C6 in the naphthalene ring of P ($EN_{90}$-$HN_{10}$) block), 130.0 ppm (C3, C7 in the naphthalene ring of P ($EN_{90}$-$HN_{10}$) block), 130.0 ppm (C4, C8 in the naphthalene ring of P ($EN_{90}$-$HN_{10}$) block), 61.2 ppm (C1, C6 in the hexylene of P ($EN_{90}$-$HN_{10}$)), 25.2 ppm (C2, C5 in the hexylene of P ($EN_{90}$-$HN_{10}$)), 20.6 ppm (C3, C4 in the hexylene of P ($EN_{90}$-$HN_{10}$)), 66.7 ppm (—O—$CH_2$—$CH_2$—O in the ethylene of P ($EN_{90}$-$HN_{10}$) block), 170.0 ppm (C in the C=O in the PLA), 69.2 ppm (C in methane —OCH($CH_3$)—CO in PLA), 15.7 ppm (C in methyl-OCH($CH_3$)—CO in PLA)); there is no signal due to transesterification reaction;

DSC: (the peak of) $T_m$ (220° C.) was ascribed to P ($EN_{90}$-$HN_{10}$) block; there is no peak ascribed to PD,LLA because of the non-crystallizability of PD,LLA.

There is only a single peak in the GPC curve, and there is no peak of transesterification reaction in NMR Spectrum, which indicates that the product is the block copolymer.

It can be concluded from the above results that the product obtained in the present example was the tri-block copolymer of P ($EN_{90}$-$HN_{10}$) and PD,LLA, and it is in B1-b-A1-b-B1 tri-block structure. $R_1$ was the structure of formula (15) in block A1, $R_2$ was $(CH_2)_2$ and $(CH_2)_6$, among which the mole ratio was $(CH_2)_2$:$(CH_2)_6$=90:10, and block B1 was PD,LLA.

Example 16

Synthesis of the Block Copolymer of P ($T_{90}N_{10}E_{90}H_{10}$) and PLA

The polyester is copolyester of two acids (terephthalic acid, naphthalene dicarboxylic acid) and alcohol (ethylene glycol, hexanediol), coded as P ($T_{90}N_{10}E_{90}H_{10}$), the subscript stands for the mol content of acid or diol in the respective acid or diol mass. The specific methods was as follows:

Step 1: Under $N_2$, the vacuum-dried dihydroxyl terminated P ($T_{90}N_{10}E_{90}H_{10}$) (1 g), the water content of which was 10 ppm and the intrinsic viscosity of which is 0.46 dL/g and D,L-lactide (3 g) were loaded into a 100 mL flask which was dried and de-oxygened. The TCE (10 mL) was charged into the flask by a syringe, and P ($T_{90}N_{10}E_{90}H_{10}$) was 100 g/L and the concentration of D,L-lactide was 0.3 kg/L, respectively. Then, the mixture was heated to 120° C. and the mixture were in homogeneous and clear solution status at this temperature. After that, 0.04 g $Sn(Oct)_2$ was added by a syringe and the reaction was carried out at 120° C. and it was monitored by GPC. After 3 h, the signal of D,L-lactide nearly disappeared, and then the reaction was quenched. The system was cooled to room temperature. The white crude product was obtained after filtration.

Step 2: The crude product was dissolved with TFA (40 mL) and the concentration was 100 g/L. Then, it was precipitated by 150 ml methanol. The product was filtered and vacuum dried, and the yield was 93.5%. GPC, FTIR, $^1$H-NMR, $^{13}$C-NMR and DSC analysis are applied on the final product. The results were as follows:

Because there are larger amount of P ($T_{90}N_{10}E_{90}H_{10}$) the solubility of this copolymer in $CHCl_3$ was not very good. Thus, it was dissolved in o-chlorophenol firstly and the concentration was 10 mg/mL, then it was diluted to 1 mg/mL by $CHCl_3$. The mobile phase was the mixture of $CHCl_3$/o-chlorophenol (10/1, v/v), flow rate was 1.0 ml $min^{-1}$ and the standards was polystyrene; the elution curve presented as normal distribution, and $M_n$=30.9K, $M_w$=42.02K, PDI=1.36;

$^1$H-NMR: 7.97 ppm (H in the phenyl of P ($T_{90}N_{10}E_{90}H_{10}$) block), 8.85 ppm (H1, H5 in naphthalene of P ($T_{90}N_{10}E_{90}H_{10}$)), 8.15 ppm (H3, H4, H7, H8 in naphthalene), 4.5 ppm (H1, H6 in the hexylene of P ($T_{90}N_{10}E_{90}H_{10}$)), 1.7 ppm (H3, H4 in the hexylene of P ($T_{90}N_{10}E_{90}H_{10}$)), 2.05 ppm (H2, H5 in the hexylene of P ($T_{90}N_{10}E_{90}H_{10}$)), 4.67 ppm (H in the ethylene of P ($T_{90}N_{10}E_{90}H_{10}$)), 5.1 ppm (H in —O—CH($CH_3$) O=C— of PLA), 1.6 ppm (H in —CH ($CH_3$) O=C— of PLA); there is no signal ascribed to transesterification reaction. The weight ratio was calculated from the integrals: $m_{P\ (T90N10E90H10)}$:$m_{PLA}$=1:2.8;

$^{13}$C-NMR: 168.0 ppm (C in the C=O which connected with naphthalene in P ($T_{90}N_{10}E_{90}H_{10}$) block), 131.2 ppm (C1, C5 in the naphthalene in P ($T_{90}N_{10}E_{90}H_{10}$) block), 132.4 ppm (C2, C6 in the naphthalene), 130.0 ppm (C3, C4, C7, C8 in the naphthalene), 61.2 ppm (C1, C6 in the hexylene of P ($T_{90}N_{10}E_{90}H_{10}$)), 25.2 ppm (C2, C5 in the hexylene of P ($T_{90}N_{10}E_{90}H_{10}$)), 20.6 ppm (C3, C4 in the hexylene of P ($T_{90}N_{10}E_{90}H_{10}$)), 63.6 ppm (—O—CH$_2$—CH$_2$—O in the ethylene of P ($T_{90}N_{10}E_{90}H_{10}$) block), 133.0 ppm (C1, C4 in phenyl of P ($T_{90}N_{10}E_{90}H_{10}$)), 129.5 ppm (C2, C3, C5, C6 in the phenyl of P ($T_{90}N_{10}E_{90}H_{10}$)) 168.4 ppm (C in the C=O which connected with phenyl in P ($T_{90}N_{10}E_{90}H_{10}$) block), 170.0 ppm (C in the C=O in the PLA), 69.2 ppm (C in methane —OCH(CH$_3$)—CO in PLA), 15.7 ppm (C in methyl-OCH(CH$_3$)—CO in PLA);

DSC: (the peak of) $T_m$ (240° C.) was ascribed to P ($T_{90}N_{10}E_{90}H_{10}$) block; there is no peak ascribed to PLA because the PD,LLA was adopted.

There is only a single peak in the GPC curve, and there is no peak of transesterification reaction in NMR Spectrum, which indicates that the product is the block copolymer.

It can be concluded from the above results that the product obtained in the present example was the tri-block copolymer of P ($T_{90}N_{10}E_{90}H_{10}$) and PD,LLA, and it is in B1-b-A1-b-B1 tri-block structure. $R_1$ was the structure of formula (15) and (11) in block A1, of which the mole ratio was (15):(11)=90:10, $R_2$ was (CH$_2$)$_2$ and (CH$_2$)$_6$, of which the mole ratio was (CH$_2$)$_2$:(CH$_2$)$_6$=90:10, and block B1 was PD,LLA.

Example 17

Synthesis of the Block Copolymer of Aromatic Copolyester 1 and PLA

The copolyester 1 is the copolyester of three acid-2,6-naphthalene dicarboxylic acid (80%), 1,4-naphthalene dicarboxylic acid (10%), 1,5-naphthalene dicarboxylic acid (10%) and three alcohol-ethylene glycol (80%), propylene glycol (10%), 1,4-butanediol (10%), the number in the bracket stands for the mol content of acid or diol in the respective acid or diol total mass.

The specific method was as follows:

Step 1: Under N$_2$, the vacuum dried dihydroxyl terminated copolyester 1 (1 g) of which the water content was 12 ppm and the intrinsic viscosity is 0.45 dL/g and L-lactide (1 g) were loaded into a 100 mL flask which was dried and de-oxygened. The TCE (20 mL) was charged into the flask by a syringe, and the concentration of copolyester 1 and L-lactide was 50 g/L and 0.05 kg/L, respectively. Then, the mixture was heated to 80° C. and the mixture were in homogeneous and clear solution status at this temperature. After that, 0.02 g Sn(Oct)$_2$ was added by a syringe and the reaction was carried out at 130° C. and it was monitored by GPC. After 5 h, the signal of L-lactide nearly disappeared, and then the reaction was quenched. The system was cooled to room temperature. The white crude product was obtained after filtration.

Step 2: The crude product was dissolved with mixed solvent of CHCl$_3$ and TFA (v:v=2:1, 40 ml) and the concentration was 50 g/L. Then, it was precipitated by 200 ml methanol. The product was filtered and vacuum dried, and the yield was 94.8%. GPC, FTIR, $^1$H-NMR, $^{13}$C-NMR and DSC analysis are applied on the final product. The results were as follows:

Because of there are larger amount of aromatic polyester, the solubility of this copolymer in CHCl$_3$ was not very good. Thus, it is dissolved by o-chlorophenol first and the concentration was 10 mg/mL, then it was diluted to 1 mg/mL by CHCl$_3$. The mobile phase was the mixture of CHCl$_3$/o-chlorophenol (10/1, v/v), flow rate was 1.0 ml min$^{-1}$ and the standards was polystyrene; the elution curve presented as normal distribution, and $M_n$=18.9K, $M_w$=25.7K, PDI=1.36;

$^1$H-NMR 8.85 ppm (H1, H5 in naphthalene of copolyester 1, 8.35 ppm (H3, H7 in naphthalene), 8.35 ppm (H4, H8 in naphthalene), 8.55 ppm (H2, H6 in naphthalene), 4.5 ppm (H1, H6 in —O—CH$_2$—CH$_2$— in the butylene of copolyester 1), 1.7 ppm (H3, H4 in —O—CH$_2$—CH$_2$— in the butylene of copolyester 1), 2.05 ppm (H2, H5 in —O—CH$_2$—CH$_2$— in the butylene of copolyester 1), 2.0 ppm (H in —O—CH$_2$—CH$_2$—CH$_2$—CH$_2$—O— in the butylene of copolyester 1), 4.67 ppm (H in the ethylene of, H1 and H3 in propylene copolyester 1), 1.55 ppm (H in the third and the fourth methylene of the hexylidene of the copolyester 1), 1.75 ppm (H in the second and the fifth methylene of the hexylidene of the copolyester 1), 5.42 ppm (H in —O—CH(CH$_3$) O=C— of PLA), 1.68 ppm (H in —CH(CH$_3$)O=C— of PLA); there is no signal ascribed to transesterification reaction. The weight ratio was calculated from the integrals, $m_{copolyester\ 1}$:$m_{PLA}$=1:1;

$^{13}$C-NMR: 170.0 ppm (C in the C=O in the PLA), 69.2 ppm (C in methane —OCH(CH$_3$)—CO in PLA), 15.7 ppm (C in methyl-OCH(CH$_3$)—CO in PLA); there is no signal ascribed to transesterification reaction. 168.4 ppm (C in the C=O in copolyester 1 block), 125.8 ppm (C2, C3 in the naphthalene in copolyester 1 block), 130.4 ppm (C5, C8 in the naphthalene), 126.9 ppm (C6, C7 in the naphthalene), 135.1 ppm (C9, C10 in the naphthalene), 63.6 ppm (—O—CH$_2$—CH$_2$—O in the ethylene of copolyester 1 block, 25.2 ppm (C in the second and the fifth methylene of the hexylidene of the copolyester 1), 20.6 ppm (C in the third and the fourth methylene of the hexylidene of the copolyester 1), 65.4 ppm (C1, C4 in —O—CH$_2$—CH$_2$—CH$_2$—CH$_2$—O— in the butylene of copolyester 1), 24.6 ppm (C2, C3-O—CH$_2$—CH$_2$—CH$_2$—CH$_2$— in the butylene of PBT), 133.0 ppm (C1, C4 in phenyl of copolyester 1), 129.5 ppm (C2, C3, C5, C6 in the phenyl of copolyester 1);

DSC: (the peaks of) $T_m$ (225° C.) was ascribed to copolyester 1 block, and $T_m$ (155° C.) was ascribed to PLLA block;

It can be concluded from the above results that the product obtained in the present example was the tri-block copolymer of copolyester 1 and PLLA, while the PLA block consisted of two different PLA block and it is in B1-b-A1-b-B1 tri-block structure. $R_1$ was the structure of formula (13), (14) and (15) in block A1, of which the mole ratio was (13):(14):(15)=80:10:10, $R_2$ was (CH$_2$)$_2$, (CH$_2$)$_3$ and (CH$_2$)$_4$, of which the mole ratio was (CH$_2$)$_2$:(CH$_2$)$_3$:(CH$_2$)$_4$=80:10:10, and block B1 was PLLA.

Example 18

Synthesis of block copolymer of PET and PLA, while the PLA block contained two different type of PLA, the specific methods was as follows:

Step 1 and 2 are the same as example 13

Step 3: Under N$_2$, the dihydroxyl terminated PLA copolymer obtained from step 2 (1 g) and D,L-lactide (1 g) were loaded into a 100 mL flask which was dried and de-oxygened and cooled under N$_2$. The o-dichlorobenzene (10 mL) was charged into the flask by a syringe, and the concentration of the production obtained from Step 2 was 100 g/L and the concentration of D,L-lactide was 0.1 kg/L. Then, the mixture was heated to 80° C. and the mixture were in homogeneous and clear solution status. After that, 0.003 g SnBr$_2$ was added and the reaction was carried out at 140° C. and it was monitored by GPC. After 5 h, the signal peak of D,L-lactide disappeared, and then the reaction was quenched. The system was cooled to room temperature. The white crude product was obtained after filtration.

Step 4: the crude product was dissolved by $CHCl_3$ (40 mL) and the concentration was 50 g/L. Then, it was precipitated by 200 ml methanol. The product was filtered and vacuum dried, and the yield was 98.2%. GPC, FTIR, $^1$H-NMR, $^{13}$C-NMR and DSC analysis are applied on the final product. The results were as follows:

GPC: $CHCl_3$ as the mobile phase, flow rate of 1 ml min$^{-1}$, and the standards was polystyrene; the elution curve presented as normal distribution, and $M_n$=31.1K, $M_w$=42.3K, PDI=1.36;

$^1$H-NMR: the same as Example 13; there is no other signal peak ascribed to transesterification reaction. The weight ratio was calculated from the integrals: $m_{PET}$:$m_{PLA}$=1:30;

$^{13}$C-NMR: the same as Example 13; there is no signal ascribed to transesterification reaction;

DSC: (the peak of) $T_m$ (175° C.) was ascribed to the PLA block; Because of the low content of PET block, there is no peak ascribed to the melting of it.

There is only a single peak in the GPC curve, and there is no peak of transesterification reaction in NMR Spectrum, which indicates that the product is the block copolymer.

It can be concluded from the above results that the product obtained in the present example was the block copolymer of PET and PLA, while the PLA block consisted of two different PLA block, and it is in B1-b-A1-b-B1 tri-block structure. $R_1$ was the structure of formula (11) in block A1, $R_2$ was $(CH_2)_2$, and block B1 consisted of two sorts of PLA block, which were PDLA block and PD,LLA block, ordered by the distance to A1.

Example 19

Synthesis of the block copolymer of poly (ethylene 1,5-naphthalate-co-hexylene 1,5-naphthalate) (coded as (P (EN$_{90}$-HN$_{10}$)) and PLA, while the PLA block contained two different PLA type. The specific methods was as follows:

Step 1 and 2 are the same as example 15

Step 3: Polymerization of lactide initiated by dihydroxyl terminated copolymer synthesized at step 2.

Under $N_2$, the product obtained from step 2 (1 g) and L-lactide (1 g) were loaded into a 100 mL flask which was dried and de-oxygened and cooled under $N_2$. The toluene (10 mL) was charged into the flask by a syringe, and the concentration of the product obtained from step 2 was 100 g/L and the concentration of L-lactide was 0.1 kg/L, respectively. Then, the mixture was heated to 80° C. and the mixture were in homogeneous and clear solution status at this temperature. After that, 0.01 g $SnCl_4$ was added and the reaction was carried out at 110° C. and it was monitored by GPC. After 6 h, the signal peak of L-lactide disappeared, and then the reaction was quenched. The system was cooled to room temperature. The white crude product was obtained after filtration.

Step 4: the crude product was dissolved by $CHCl_3$ (40 mL) and the concentration was 50 g/L. Then, it was precipitated by 160 ml methanol. The product was filtered and vacuum dried, and the yield was 95.2%. GPC, FTIR, $^1$H-NMR, $^{13}$C-NMR and DSC analysis are applied on the final product. The results were as follows:

GPC: $CHCl_3$ as the mobile phase, flow rate of 1 ml min$^{-1}$, and the standards was polystyrene; the elution curve presented as normal distribution, and $M_n$=35.1K, $M_w$=53.71K, PDI=1.53

$^1$H-NMR: the same as Example 15; there is no signal ascribed to transesterification reaction. The weight ratio was calculated by integrals: $m_{P\ (EN90\text{-}co\text{-}HN10)}$:$m_{PLA}$=1:7;

$^{13}$C-NMR: the same as Example 15; there is no signal ascribed to transesterification reaction;

DSC: the peaks of $T_m$ (220° C.) were ascribed to P (EN$_{90}$-HN$_{10}$) block and $T_m$ (160° C.) were ascribed to PLA block.

There is only a single peak in the GPC curve, and there is no peak of transesterification reaction in NMR Spectrum, which indicates that the product is a block copolymer.

It can be concluded from the above results that the product obtained in the present example was the block (B1-b-A1-b-B1) copolymer of P (EN$_{90}$-HN$_{10}$) and PLA., while the PLA block consisted of two different PLA block, and it is in B1-b-A1-b-B1 tri-block structure. $R_1$ was the structure of formula (15) in block A1, while $R_2$ was $(CH_2)_2$ and $(CH_2)_6$ (mol:mol=9:1). Block B1 consisted of two sorts of PLA block, which were PD,LLA block and PLLA block, ordered by the distance to A1.

Example 20

Synthesis of block copolymer of PBT and PLA, while the PLA block consisted of two different PLA type, the specific methods was as follows:

step 1-2 are the same as example 11

Step 3: Polymerization of lactide initiated by dihydroxyl terminated copolymer synthesized at step 2.

Under $N_2$, the product obtained from step 2 (1 g) and D-lactide (8 g) were loaded into a 100 mL flask which was dried and de-oxygened and cooled under $N_2$. The TCE (10 mL) was charged into the flask by a syringe, and the production obtained from Step 2 was 100 g/L and the concentration of L-lactide was 0.8 kg/L. Then, the mixture was heated to 50° C. and the mixture were in homogeneous and clear solution status at this temperature. After that, 0.0009 g Sn(Oct)$_2$ was added and the reaction was carried out at 110° C. and it was monitored by GPC. After 6 h, the signal peak of L-lactide disappeared, and then the reaction was quenched. The system was cooled to room temperature. The white crude product was obtained after filtration.

Step 4: the crude product was dissolved by $CHCl_3$ (90 mL) and the concentration was 100 g/L. Then, it was precipitated by 360 ml methanol. The product was filtered and vacuum dried, and the yield was 99.1%. GPC, FTIR, $^1$H-NMR, $^{13}$C-NMR and DSC analysis are applied on the final product. The results were as follows:

GPC: $CHCl_3$ as the mobile phase, flow rate of 1 ml min$^{-1}$, and the standards was polystyrene, the elution curve presented as normal distribution, and $M_n$=60.1K, $M_w$=87.0K, PDI=1.45;

$^1$H-NMR: the same as Example 1; there is no signal ascribed to transesterification reaction. The weight ratio was calculated from the integrals: $m_{PBT}$:$m_{PLA}$=1:120;

$^{13}$C-NMR: the same as Example 11; there is no signal ascribed to transesterification reaction;

DSC: the peak of $T_m$ (220° C.) was ascribed to the PLA stereocomplex formed by the different PLA block type; Because of the low content, there is no peak ascribed to the melting of PBT block.

There is only a single peak in the GPC curve, and there is no peak of transesterification reaction in NMR Spectrum, which indicates that the product is the block copolymer.

It can be concluded from the above results that the product obtained in the present example was the tri-block (B1-b-A1-b-B1) copolymer of PBT and PLA, while the PLA block consisted of two different PLA block, and it is in B1-b-A1- b-B1 tri-block structure. $R_1$ was the structure of formula (11) in block A1, $R_2$ was $(CH_2)_4$, and block B1 consisted of two sorts of PLA block, which were PLLA block and PDLA block, ordered by the distance to A1.

Example 21

Synthesis of block copolymer of PTT and PLA, while the PLA block contained two different PLA type, the specific methods was as follows:

Step 1 and 2 are the same of example 12

Step 3 Polymerization of lactide initiated by dihydroxyl terminated copolymer synthesized at step 2.

Under $N_2$, the product obtained from step 2 (1 g) and L-lactide (20 g) were loaded into a 100 mL flask which was dried and de-oxygenated and cooled under $N_2$. The $CHCl_3$ (10 mL) was charged into the flask by a syringe, and the concentration of copolymer was 100 g/L and the concentration of L-lactide was 2 kg/L, respectively. Then, the mixture was heated to 50° C. and the mixture were in homogeneous and clear solution status at this temperature. After that, 0.21 g $SnCl_2$ was added and the reaction was carried out at 50° C. and it was monitored by GPC. After 24 h, the signal of L-lactide disappeared, and then the reaction was quenched. The system was cooled to room temperature. The white crude product was obtained after filtration.

Step 4: the crude product was dissolved by $CHCl_3$ (210 mL) and the concentration was 100 g/L. Then, it was precipitated by 630 ml methanol. The product was filtered and vacuum dried, and the yield was 97.2%. GPC, FTIR, $^1$H-NMR, $^{13}$C-NMR and DSC analysis are applied on the final product. The results were as follows:

GPC: $CHCl_3$ as the mobile phase, flow rate of 1 ml min$^{-1}$ and polystyrene as the standards; the elution curve presented as normal distribution, and $M_n$=53.9K, $M_w$=83.55K, PDI=1.55;

$^1$H-NMR: the same as Example 12; there is no signal ascribed to transesterification reaction. The weight ratio was calculated from the integrals: $m_{PTT}$:$m_{PLA}$=1:300;

$^{13}$C-NMR: the same as Example 12; there is no signal ascribed to transesterification reaction;

DSC: the peak of $T_m$ (220° C.) was ascribed to the PLA stereocomplex formed by the different PLA block type; the peak of $T_m$ (173° C.) was ascribed to the PLA block. Because of the low content, there is no peak ascribed to the melting of PTT block.

There is only a single peak in the GPC curve and there is no peak of transesterification reaction in NMR Spectrum, which indicates that the product is a block copolymer.

It can be concluded from the above results that the product obtained in the present example was the block copolymer of PBT and PLA, of which the PLA was of two sorts of structure, and it is in B1-b-A1-b-B1 tri-block structure. Wherein $R_1$ in the A1 block was the structure of (11), and $R_2$ was $(CH_2)_3$, block B1 was consisted of two PLA block, which were PDLA block and PLLA block, ordered by the distance to A1.

Example 22

Synthesis of block copolymer of poly (hexylene 2,6-naphthalate) PHN and PLA, while the PLA block contained two different type of PLA, the specific methods was as follows:

Step 1: Polymerization of lactide initiated by dihydroxyl terminated PHN.

Under $N_2$, the vacuum dried dihydroxyl terminated PHN (0.1 g) of which the water content was 20 ppm and the intrinsic viscosity is 1.0 dL/g and D,L-lactide (2 g) were loaded into a 100 mL flask which was dried and de-oxygenated. The 1,2,4-trichlorobenzene (10 mL) was charged into the flask by a syringe, and the concentration of PHN was 10 g/L and the concentration of D,L-lactide was 0.2 kg/L. Then, the mixture was heated to 130° C. and the mixture were in homogeneous and clear solution status. After that, 0.003 g $SnCl_4$ was added by a syringe. The reaction was carried out at 150° C. and it was monitored by GPC. After 2 h, the signal peak of D,L-lactide nearly disappeared, and then the reaction was quenched. The system was cooled to room temperature. The white crude product was obtained after filtration.

Step 2: the crude product obtained in step 1 was dissolved by $CHCl_3$ (40 mL) and the concentration was 50 g/L. Then, it was precipitated by 120 ml methanol. The product was filtered and vacuum dried.

Step 3: polymerization of lactide initiated by dihydroxyl terminated copolymer obtained at step 2.

Under $N_2$, the product obtained from step 2 (1 g) and L-lactide (20 g) were loaded into a 100 mL flask which was dried and de-oxygenated and cooled under $N_2$. The $CH_2Cl_2$ (10 mL) was charged into the flask by a syringe, and the concentration of copolymer was 100 g/L and the concentration of L-lactide was 2 kg/L, respectively. Then, the mixture was heated to 30° C. and the mixture were in homogeneous and clear solution status at this temperature. After that, 0.21 g $SnCl_2$ was added and the reaction was carried out at 30° C. and it was monitored by GPC. After 24 h, the signal of L-lactide nearly disappeared, and then the reaction was quenched. The system was cooled to room temperature. The white crude product was obtained after filtration.

Step 4: 210 mL $CHCl_3$ was added into the crude product and the concentration of the crude product was 100 g/L. Then, it was precipitated by 840 ml methanol. The product was filtered and vacuum dried, and the yield was 97.6%. GPC, FTIR, $^1$H-NMR, $^{13}$C-NMR and DSC analysis are applied on the final product. The results were as follows:

GPC: $CHCl_3$ as the mobile phase, flow rate of 1 ml min$^{-1}$ and polystyrene as the standards, the elution curve presented as normal distribution, and $M_n$=83.8K, $M_w$=121.51K, PDI=1.45;

$^1$H-NMR: 8.85 ppm (H1, H5 in naphthalene of PHN block), 8.15 ppm (H3, H4, H7, H8 in naphthalene), 4.5 ppm (H1, H6 in the hexylene of PHN), 1.7 ppm (H3, H4 in the hexylene of P PHN), 2.05 ppm (H2, H5 in the hexylene of PHN), 5.1 ppm (H in —O—CH(CH$_3$)O=C— of PLA), 1.6 ppm (H in —CH(CH$_3$)O=C— of PLA); there is no signal ascribed to transesterification reaction. The weight ratio was calculated from the integrals: $m_{PHN}$:$m_{PLA}$=1:35;

$^{13}$C-NMR: 167.0 ppm (C in the C=O in PHN block), 131.2 ppm (C1, C5 in the naphthalene in P (EN$_{90}$-HN$_{10}$) block), 132.4 ppm (C2, C6 in the naphthalene), 130.0 ppm (C3, C4, C7, C8 in the naphthalene), 61.2 ppm (C1, C6 in the hexylene of PHN), 25.2 ppm (C2, C5 in the hexylene of PHN), 20.6 ppm (C3, C4 in the hexylene of PHN), 66.7 ppm (—O—CH$_2$—CH$_2$—O in the ethylene of PHN block), 170.0 ppm (C in the C=O in the PLA), 69.2 ppm (C in methane —OCH(CH$_3$)—CO in PLA), 15.7 ppm (C in methyl-OCH (CH$_3$)—CO in PLA)); there is no signal due to transesterification reaction;

There is only a single peak in the GPC curve, and there is no peak of transesterification reaction in NMR Spectrum, which indicates that the product is the block copolymer.

It can be concluded from the above results that the product obtained in the present example was the tri-block copolymer of PHN and PLA, while the PLA block contained two different type of PLA, and it is in B1-b-A1-b-B1 tri-block structure. $R_1$ was the structure of formula (15) in block A1, $R_2$ was (CH$_2$)$_6$, and block B1 was consisted of two PLA block, which were PD,LLA block and PLLA block, ordered by the distance to A1.

Example 23

Synthesis of block copolymer of Poly (1,4-cyclohexylene dimethylene 2,6-naphthalate) (PCN) and PLA, while the PLA block consisted of two different PLA block, the specific methods was as follows:

Step 1: polymerization of lactide initiated by dihydroxyl terminated PCN

Under N$_2$, the vacuum dried dihydroxyl terminated PCN (0.1 g) of which the water content was 20 ppm and the intrinsic viscosity is 0.55 dL/g and D-lactide (2.0 g) were loaded into a 100 mL flask which was dried and de-oxygened. The nitrobenzene (10 mL) was charged into the flask by a syringe, and the concentration of PCN was 10 g/L and the concentration of D-lactide was 0.2 kg/L, respectively. Then, the mixture was heated to 100° C. and the mixture were in homogeneous and clear solution status. After that, 0.003 g Sn(Oct)$_2$ was added by a syringe. The reaction was carried out at 120° C. and it was monitored by GPC. After 3 h, the signal of D-lactide disappeared, and then the reaction was quenched. The system was cooled to room temperature. The white crude product was obtained after filtration.

Step 2: the crude product was dissolved by CHCl$_3$ (40 mL) and the concentration was 52 g/L. Then, it was precipitated by 150 ml methanol. The product was filtered and vacuum dried.

Step 3: Polymerization of lactide initiated by the product obtained at step 2

Under N$_2$, the product obtained from step 2 (1.5 g) and D,L-lactide (3 g) were loaded into a 100 mL flask which was dried and de-oxygened and cooled under N$_2$. The CCl$_4$ (5 mL) was charged into the flask by a syringe, and the concentration of copolymer was 300 g/L and the concentration of D,L-lactide 0.6 kg/L. Then, the mixture was heated to 50° C. and the mixture were in homogeneous and clear solution status at this temperature. After that, 0.0045 g SnCl$_2$ was added by a syringe and the reaction was carried out at 110° C. and it was monitored by GPC. After 14 h, the signal of D,L-lactide disappeared, and then the reaction was quenched. The system was cooled to room temperature. The white crude product was obtained after filtration.

Step 4: the crude product was dissolved by CHCl$_3$ (45 mL) and the concentration was 100 g/L. Then, it was precipitated by 150 ml methanol. The product was filtered and vacuum dried, and the yield was 96.2%. GPC, FTIR, $^1$H-NMR, $^{13}$C-NMR and DSC analysis are applied on the final product. The results were as follows:

GPC: CHCl$_3$ as the mobile phase, flow rate of 1 ml min$^{-1}$ and polystyrene as the standards; the elution curve presented as normal distribution, and M$_n$=53.4K, M$_w$=82.51K, PDI=1.55;

$^1$H-NMR: 8.82 ppm (H1, H5 in naphthalene of PCN block), 8.11 ppm (H3, H4, H7, H8 in naphthalene), 4.4 ppm (H in methylene which connected with O in PCN), 1.3-2.2 ppm (H in the cyclohexylene of PCN), 5.1 ppm (H in —O—CH(CH$_3$) O=C— of PLA), 1.6 ppm (H in —CH (CH$_3$) O=C— of PLA); there is no other signal peak ascribed to transesterification reaction. The weight ratio was calculated from the integrals: m$_{PCN}$:m$_{PLA}$=1:50;

$^{13}$C-NMR: 168.2 ppm (C in the C=O in PCN block), 131.1 ppm (C1, C5 in the naphthalene in PCN block), 132.3 ppm (C2, C6 in the naphthalene), 130.1 ppm (C3, C7 in the naphthalene), 130.4 ppm (C4, C8 in the naphthalene), 136.1 ppm (C9, C10 in the naphthalene), 61.2 ppm (C in methylene which connected with O in PCN), 25.2 ppm (C1, C4 in the cyclohexylene of PCN), 18.6 ppm (C2, C3, C5, C6 in the cyclohexylene of PCN), 170.0 ppm (C in the C=O in the PLA), 69.2 ppm (C in methane —OCH(CH$_3$)—CO in PLA), 15.7 ppm (C in methyl-OCH(CH$_3$)—CO in PLA)); there is no other signal peak due to transesterification reaction;

DSC: (the peak of) T$_m$ (168° C.) was ascribed to the PLA block. Because of the low content of PCN block, there is no peak ascribed to the melting of it.

There is only a single peak in the GPC curve, and there is no peak of transesterification reaction in NMR Spectrum, which indicates that the product is the block copolymer.

It can be concluded from the above results that the product obtained in the present example was the block copolymer of PCN and PLA, while the PLA block consisted of two different PLA block, and it is in B1-b-A1-b-B1 tri-block structure. R$_1$ was the structure of formula (15) in block A1, R$_2$ was

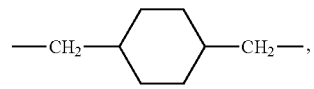

and block B1 consisted of two sorts of PLA block, which were PDLA block and PD,LLA block, ordered by the distance to A1.

Example 24

Synthesis of block copolymer of poly (ethylene 1,4-naphthalate) and PLA, while the PLA block contained two different PLA type, the specific methods was as follows:

Step 1: Under N$_2$, the vacuum dried dihydroxyl terminated poly (ethylene 1,4-naphthalate) (1 g) of which the water content was 12 ppm and the intrinsic viscosity is 0.68 dL/g and D-lactide (3.0 g) were loaded into a 100 mL flask which was dried and de-oxygened. The mixed solvent of TCE, o-dichlorobenzene, nitrobenzene (V:V:V=1, 20 mL) was charged into the flask by a syringe, and the concentration of poly (ethylene 1,4-naphthalate) was 50 g/L and the concentration of D-lactide was 0.15 kg/L. Then, the mixture was heated to 120° C. and the mixture were in homogeneous and clear solution status. After that, 0.02 g Sn(Oct)$_2$ was added by a syringe. The reaction was carried out at 120° C. and it was monitored by GPC. After 5 h, the signal of D-lactide nearly disappeared, and then the reaction was quenched. The system was cooled to room temperature. The white crude product was obtained after filtration.

Step 2: the crude product was dissolved with TFA (20 mL) and the concentration was 200 g/L. Then, it was precipitated by 100 ml methanol. The product was filtered and vacuum dried.

Step 3: Polymerization of lactide initiated by dihydroxyl terminated copolymer synthesized at step 2.

Under N$_2$, the product obtained from step 2 (1 g) and D,L-lactide (10 g) were loaded into a 100 mL flask which was dried and de-oxygened and cooled under N$_2$. The tetrahydrofuran (THF, 5 mL) was charged into the flask by a syringe, and the concentration of the product obtained from step 2 was 200 g/L and the concentration of D,L-lactide 2 kg/L. Then, the mixture was heated to 30° C. and the mixture were in homogeneous and clear solution status at this temperature. After that, 0.004 g SnCl$_2$ was added and the reaction was carried out at 80° C. and it was monitored by GPC. After 20 h, the signal of D,L-lactide disappeared, and then the reaction was quenched. The system was cooled to room temperature. The white crude product was obtained after filtration.

Step 4: the crude product was dissolved by $CHCl_3$ (110 mL) and the concentration was 100 g/L. Then, it was precipitated by 400 ml methanol. The product was filtered and vacuum dried. GPC, FTIR, $^1$H-NMR, $^{13}$C-NMR and DSC analysis are applied on the final product. The results were as follows:

GPC: $CHCl_3$ as the mobile phase, flow rate of 1 ml min$^{-1}$ and polystyrene as the standards; the elution curve presented as normal distribution, and $M_n$=151.4K, $M_w$=228.6K, PDI=1.51;

$^1$H-NMR: 8.75 ppm (H2, H3 in naphthalene of poly (ethylene 1,4-naphthalate) block), 8.05 ppm (H6, H7 in naphthalene), 8.55 ppm (H5, H8 in naphthalene), 4.7 ppm (H in the methylene of poly (ethylene 1,4-naphthalate) block), 5.1 ppm (H in —O—CH(CH$_3$)O=C— of PLA), 1.6 ppm (H in —CH(CH$_3$)O=C— of PLA); there is no signal ascribed to transesterification reaction. The weight ratio was calculated from the integrals: $m_{poly\ (ethylene\ 1,4-naphthalate)}$:$m_{PLA}$=1:26;

$^{13}$C-NMR: 168.6 ppm (C in the C=O in poly (ethylene 1,4-naphthalate) block), 132.7 ppm (C1, C4 in the naphthalene), 126.9 ppm (C2, C3 in the naphthalene), 131.4 ppm (C5, C8 in the naphthalene), 127.9 ppm (C6, C7 in the naphthalene), 135.1 ppm (C9, C10 in the naphthalene), 66.7 ppm (C in the ethylene of poly (ethylene 1,4-naphthalate) block), 170.0 ppm (C in the C=O in the PLA), 69.2 ppm (C in methane —OCH(CH$_3$)—CO in PLA), 15.7 ppm (C in methyl-OCH(CH$_3$)—CO in PLA)); there is no signal due to transesterification reaction;

DSC: the peak of $T_m$ (158° C.) was ascribed to the PLA block. Because of the low content, there is no peak ascribed to the melting of poly (ethylene 1,4-naphthalate) block.

There is only a single peak in the GPC curve, and there is no peak of transesterification reaction in NMR Spectrum, which indicates that the product is the block copolymer.

It can be concluded from the above results that the product obtained in the present example was the block (B1-b-A1-b-B1) copolymer of poly (ethylene 1,4-naphthalate) and PLA, while the PLA block consisted of two different PLA block, and it is in B1-b-A1-b-B1 tri-block structure. $R_1$ was the structure of formula (13) in block A1, while $R_2$ was $(CH_2)_2$. Block B1 was consisted of two sorts of PLA block, which were PDLA block and PD,LLA block, ordered by the distance to A1.

Example 25

Synthesis of block copolymer of PET and PLA, while the PLA block contained three different type of PLA, the specific method was as follows:

Step 1, 2, 3 and 4 were the same as example 18

Step 5: Polymerization of lactide initiated by the product obtained at step 4

Under $N_2$, the product obtained from step 4 (3 g) and L-lactide (1 g) were loaded into a 100 mL flask which was dried and de-oxygened and cooled under $N_2$. The o-dichlorobenzene (10 mL) was charged into the flask by a syringe, and the concentration of copolymer was 300 g/L and the concentration of lactide was 0.1 kg/L. Then, the mixture was heated to 140° C. and the mixture were in homogeneous and clear solution status. After that, 0.004 g SnBr$_2$ was added and the reaction was carried out at 140° C. and it was monitored by GPC. After 3 h, the signal of lactide disappeared, and then the reaction was quenched. The system was cooled to room temperature. The white crude product was obtained after filtration.

Step 6: The crude product was dissolved by $CHCl_3$ (40 mL) and the concentration was 100 g/L. Then, it was precipitated by 200 ml methanol. The product was filtered and vacuum dried, and the yield was 97.2%. GPC, FTIR, $^1$H-NMR, $^{13}$C-NMR and DSC analysis are applied on the final product. The results were as follows:

GPC: $CHCl_3$ as the mobile phase, flow rate of 1 ml min$^{-1}$ and polystyrene as the standards; the elution curve presented as normal distribution, and $M_n$=31.1K, $M_w$=45.1K, PDI=1.45;

$^1$H-NMR: the same as Example 13; there is no signal ascribed to transesterification reaction. The weight ratio was calculated from the integrals: $m_{PET}$:$m_{PLA}$=1:40;

$^{13}$C-NMR: the same as Example 13; there is no signal ascribed to transesterification reaction, there is no signal ascribed to transesterification reaction;

DSC: the peak of $T_m$ (175° C.) was ascribed to the PLA block; the peak of $T_m$ (215° C.) was ascribed to the PLA stereocomplex formed by the PLLA block and PDLA block. Because of the low content of PET block, there is no peak ascribed to the melting of it.

There is only a single peak in the GPC curve, and there is no peak of transesterification reaction in NMR Spectrum, which indicates that the product is the block copolymer.

It can be concluded from the above results that the product obtained in the present example was the block copolymer of PET and PLA, while the PLA block consisted of three different PLA block, and it is in B1-b-A1-b-B1 tri-block structure. $R_1$ was the structure of formula (11) in block A1, $R_2$ was $(CH_2)_2$, and block B1 consisted of three sorts of PLA block, which were PDLA block, PD,LLA block and PLLA block, ordered by the distance to A1.

Example 26

Synthesis of the block copolymer of poly (ethylene 2,6-naphthalate-co-hexylene 2,6-naphthalate) (P (EN$_{90}$-HN$_{10}$)) and PLA, while the PLA block contained three different type of PLA, the specific methods was as follows:

step (1), (2), (3) and (4) are the same of example 19

Step 5: Polymerization of lactide initiated by the product obtained at step 4.

Under $N_2$, the product obtained from step 4 (1 g) and D-lactide (1 g) were loaded into a 100 mL flask which was dried and de-oxygened and cooled under $N_2$. The toluene (5 mL) was charged into the flask by a syringe, and the concentration of copolymer was 200 g/L and the concentration of D-lactide was 0.2 kg/L. Then, the mixture was heated to 80° C. and the mixture were in homogeneous and clear solution status at this temperature. After that, 0.01 g SnCl$_4$ was added and the reaction was carried out at 110° C. and it was monitored by GPC. After 5 h, the signal peak of D-lactide disappeared, and then the reaction was quenched. The system was cooled to room temperature. The white crude product was obtained after filtration.

Step 6: The crude product obtained in step 5 was dissolved by $CHCl_3$ (40 mL) and the concentration was 50 g/L. Then, it was precipitated by 160 ml methanol. The product was filtered and vacuum dried, and the yield was 94.2%. Then, this product was characterized by GPC, $^1$H-NMR, $^{13}$C-NMR and DSC. The results were as follows:

GPC: $CHCl_3$ as the mobile phase, flow rate of 1 ml min$^{-1}$ and polystyrene as the standards; the elution curve presented as normal distribution, and $M_n$=56.1K, $M_w$=85.27K, PDI=1.52;

$^1$H-NMR: the same as Example 15; there is no signal ascribed to transesterification reaction. The weight ratio was calculated from the integrals: $m_{P\ (EN90-HN10)}:m_{PLA}=1:13$;

$^{13}$C-NMR: the same as Example 15; there is no signal ascribed to transesterification reaction, DSC: the peak of $T_m$ (220° C.) was ascribed to P ($EN_{90}$-co-$HN_{10}$) block, and the peak of $T_m$ (205° C.) was ascribed to PLA stereocomplex formed by the PLLA block and PDLA block.

There is only a single peak in the GPC curve, and there is no peak of transesterification reaction in NMR Spectrum, which indicates that the product is the block copolymer.

It can be concluded from the above results that the product obtained in the present example was the block copolymer of PET and PLA, while the PLA block consisted of three different PLA block, and it is in B1-b-A1-b-B1 tri-block structure. $R_1$ was the structure of formula (15) in block A1, while $R_2$ was $(CH_2)_2$ and $(CH_2)_6$ (mol:mol=9:1), and block B1 consisted of three sorts of PLA block, which were, PD,LLA block, PLLA block, and PDLA block, ordered by the distance to A1.

Example 27

Synthesis of block copolymer of PBT and PLA, while the PLA block contained three different type of PLA, the specific methods was as follows:

Step 1, 2, 3 and 4 are the same of example 20

Step 5: Polymerization of lactide initiated by the product obtained at step 4.

Under $N_2$, the product obtained from step 4 (1 g) and D,L-lactide (1 g) were loaded into a 100 mL flask which was dried and de-oxygened and cooled under $N_2$. The TCE (10 mL) was charged into the flask by a syringe, and the concentration of copolymer was 100 g/L and the concentration of D,L-lactide was 0.1 kg/L, respectively. Then, the mixture was heated to 50° C. and the mixture were in homogeneous and clear solution status at this temperature. After that, 0.0002 g Sn(Oct)$_2$ was added and the reaction was carried out at 110° C. and it was monitored by GPC. After 5 h, the signal peak of D,L-lactide nearly disappeared, and then the reaction was quenched. The system was cooled to room temperature.

Step 6: the crude product was dissolved by CHCl$_3$ (20 mL) and the concentration was 100 g/L. Then, it was precipitated by 100 ml methanol. The product was filtered and vacuum dried, and the yield was 97.1%. GPC, FTIR, $^1$H-NMR, $^{13}$C-NMR and DSC analysis are applied on the final product. The results were as follows:

GPC: CHCl$_3$ as the mobile phase, flow rate of 1 ml min$^{-1}$ and polystyrene as the standards; the elution curve presented as normal distribution, and $M_n$=90.1K, $M_w$=129.7K, PDI=1.44;

$^1$H-NMR: the same as Example 20; there is no signal ascribed to transesterification reaction. The weight ratio was calculated from the integrals: $m_{PBT}:m_{PLA}=1:200$;

$^{13}$C-NMR: the same as Example 20; there is no signal ascribed to transesterification reaction.

DSC: the peak of $T_m$ (220° C.) was ascribed to the PLA stereocomplex formed by PLLA block and PDLA block; the peak of $T_m$ (160° C.) was ascribed to the PLA block. Because of the low content, there is no peak ascribed to the melting of PBT block.

There is only a single peak in the GPC curve, and there is no peak of transesterification reaction in NMR Spectrum, which indicates that the product is the block copolymer.

It can be concluded from the above results that the product obtained in the present example was the tri-block (B1-b-A1-b-B1) copolymer of PBT and PLA, while the PLA block consisted of three different PLA block, and it is in B1-b-A1-b-B1 tri-block structure. $R_1$ was the structure of formula (11) in block A1, $R_2$ was $(CH_2)_4$, and block B1 consisted of three sorts of PLA block, which were PLLA block, PDLA block and PD,LLA block, ordered by the distance to A1.

Example 28

Synthesis of block copolymer of PTT and PLA, while the PLA block contained three different type of PLA, the specific methods was as follows:

Step 1, 2, 3 and 4 are the same as example 21

Step 5: Polymerization of lactide initiated by the product obtained at step 4

Under $N_2$, the product obtained from step 5 (3 g) and D,L-lactide (1 g) were loaded into a 100 mL flask which was dried and de-oxygened and cooled under $N_2$. The CHCl$_3$ (10 mL) was charged into the flask by a syringe, and the concentration of copolymer was 300 g/L and the concentration of D,L-lactide was 0.1 kg/L. Then, the mixture was heated to 50° C. and the mixture were in homogeneous and clear solution status at this temperature. After that, 0.04 g SnCl$_2$ was added and the reaction was carried out at 50° C., and it was monitored by GPC. After 24 h, the signal of D,L-lactide nearly disappeared, and then the reaction was quenched. The system was cooled to room temperature. The white crude product was obtained after filtration.

Step 6: The crude product was dissolved by CHCl$_3$ (50 mL) and the concentration was 80 g/L. Then, it was precipitated by 150 ml methanol. The product was filtered and vacuum dried, and the yield was 96.2%. GPC, FTIR, $^1$H-NMR, $^{13}$C-NMR and DSC analysis are applied on the final product. The results were as follows:

GPC: CHCl$_3$ as the mobile phase, flow rate of 1 ml min$^{-1}$ and polystyrene as the standards; the elution curve presented as normal distribution, and $M_n$=63.9K, $M_w$=100.96K, PDI=1.58;

$^1$H-NMR: the same as Example 12; there is no signal ascribed to transesterification reaction. The weight ratio was calculated from the integrals: $m_{PTT}:m_{PLA}=1:350$;

$^{13}$C-NMR: the same as Example 12; there is no signal ascribed to transesterification reaction.

DSC: the peak of $T_m$ (220° C.) was ascribed to the PLA stereocomplex formed by PLLA block and PDLA block; the peak of $T_m$ (173° C.) was ascribed to the PLA block. Because of the low content, there is no peak ascribed to the melting of PTT block.

There is only a single peak in the GPC curve, and there is no peak of transesterification reaction in NMR Spectrum, which indicates that the product is the block copolymer.

It can be concluded from the above results that the product obtained in the present example was the block copolymer of PBT and PLA, of which the PLA was of three sorts of structure, and it is in B1-b-A1-b-B1 tri-block structure. Wherein $R_1$ in the A1 block was the structure of (11), and $R_2$ was $(CH_2)_3$, block B1 was consisted of two PLA block, which were PDLA block, PLLA block and PD,LLA block, ordered by the distance to A1.

Example 29

Synthesis of block copolymer of poly (1,6-hexylene 2,6-naphthalate) PHN and PLA, while the PLA block contained three different type of PLA, the specific methods was as follows:

Step 1, 2, 3 and 4 are the same of example 22

Step 5 Polymerization of lactide initiated by the product obtained at step 4.

Under N$_2$, the product obtained from step 4 (1 g) and D-lactide (1 g) were loaded into a 100 mL flask which was dried and de-oxygened and cooled under N$_2$. The CH$_2$Cl$_2$ (10 mL) was charged into the flask by a syringe, and the concentration of copolymer was 100 g/L and the concentration of D-lactide was 1 kg/L. Then, the mixture was heated to 30° C. and the mixture were in homogeneous and clear solution status at this temperature. After that, 0.02 g SnCl$_2$ was added and the reaction was carried out at 30° C. and it was monitored by GPC. After 24 h, the signal peak of D-lactide nearly disappeared, and then the reaction was quenched. The system was cooled to room temperature.

Step 6: The crude product obtained in step 5 was dissolved by CHCl$_3$ (20 mL) and the concentration was 100 g/L. Then, it was precipitated by 100 ml methanol. The product was filtered and vacuum dried, and the yield was 93.6%. GPC, FTIR, $^1$H-NMR, $^{13}$C-NMR and DSC analysis are applied on the final product. The results were as follows:

GPC: CHCl$_3$ as the mobile phase, flow rate of 1 ml min$^{-1}$ and polystyrene as the standards; the elution curve presented as normal distribution, and $M_n$=103.8K, $M_w$=150.51K, PDI=1.45;

$^1$H-NMR: the same as Example 22; there is no signal ascribed to transesterification reaction. The weight ratio was calculated from the integrals: $m_{PHN}$:$m_{PLA}$=1:60;

$^{13}$C-NMR: the same as Example 22; there is no signal ascribed to transesterification reaction.

DSC: the peak of $T_m$ (205° C.) was ascribed to the PHN block. The peak of $T_m$ (220° C.) was ascribed to the PLA stereocomplex formed by the different PLLA block and PDLA block; the peak of $T_m$ (155° C.) was ascribed to the PLA block.

There is only a single peak in the GPC curve, and there is no peak of transesterification reaction in NMR Spectrum, which indicates that the product is the block copolymer.

It can be concluded from the above results that the product obtained in the present example was the tri-block copolymer of PHN and PLA, while the PLA block contained three different type of PLA, and it is in B1-b-A1-b-B1 tri-block structure. R$_1$ was the structure of formula (15) in block A1, R$_2$ was (CH$_2$)$_6$, and block B1 was consisted of three PLA block, which were PD,LLA block, PLLA block and PDLA block, ordered by the distance to A1.

Example 30

Synthesis of block copolymer of poly (1,4-cyclohexylene dimethylene 2,6-naphthalate) (PCN) and PLA, while the PLA block contained three different type of PLA, the specific method was as follows:

Step 1, 2, 3 and 4 are the same of example 23

Step 5: Polymerization of lactide initiated by the product obtained at step 4.

Under N$_2$, the product obtained from step 4 (1.5 g) and L-lactide (3 g) were loaded into a 100 mL flask which was dried and de-oxygened and cooled under N$_2$. The CCl$_4$ (5 mL) was charged into the flask by a syringe, and the concentration of copolymer and L-lactide was 300 g/L and 0.6 kg/L, respectively. Then, the mixture was heated to 50° C. and the mixture were in homogeneous and clear solution status at this temperature. After that, 0.0045 g SnCl$_2$ was added and the reaction was carried out at 110° C. and it was monitored by GPC. After 14 h, the signal of L-lactide disappeared, and then the reaction was quenched. The system was cooled to room temperature.

Step 6: the crude product obtained in step 5 was dissolved by CHCl$_3$ (45 mL) and the concentration was 100 g/L. Then, it was precipitated by 100 ml methanol. The product was filtered and vacuum dried to obtain the terminal product, and the yield was 95.2%. GPC, FTIR, $^1$H-NMR, $^{13}$C-NMR and DSC analysis are applied on the final product. The results were as follows:

GPC: CHCl$_3$ as the mobile phase, flow rate of 1 ml min$^{-1}$ and polystyrene as the standards; the elution curve presented as normal distribution, and $M_n$=73.4K, $M_w$=111.76K, PDI=1.61;

$^1$H-NMR: the same as Example 23; there is no signal ascribed to transesterification reaction. The weight ratio was calculated from the integrals: $m_{PCN}$:$m_{PLA}$=1:90;

$^{13}$C-NMR: the same as Example 23; there is no signal ascribed to transesterification reaction. DSC: the peak of $T_m$ (165° C.) was ascribed to the PLA block. The peak of $T_m$ (210° C.) was ascribed to the PLA stereocomplex formed by PLLA block and PDLA block; the peak of PCN was absent because of the low content.

There is only a single peak in the GPC Curve, and there is no peak of transesterification reaction in NMR Spectrum, which indicates that the product is the block copolymer.

It can be concluded from the above results that the product obtained in the present example was the block copolymer of PCN and PLA, while the PLA block consisted of three different PLA block, and it is in B1-b-A1-b-B1 tri-block structure. R$_1$ was the structure of formula (15) in block A1, R$_2$ was

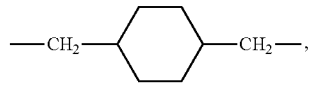

and block B1 consisted of three sorts of PLA block, which were PDLA block, PD,LLA block and PLLA block, ordered by the distance to A1.

Example 31

Synthesis of block copolymer of poly (ethylene 1,4-naphthalate) and PLA, while the PLA block contained three different PLA type, the specific methods was as follows:

Step 1, 2, 3 and 4 are the same of example 24

Step 5: Polymerization of lactide initiated by the product obtained at step 4.

Under N$_2$, the product obtained from step 4 (1 g) and L-lactide (1 g) were loaded into a 100 mL flask which was dried and de-oxygened and cooled under N$_2$. The tetrahydrofuran (5 mL) was charged into the flask by a syringe, and the concentration of copolymer was 200 g/L and the concentration of L-lactide was 0.2 kg/L. Then, the mixture was heated to 30° C. and the mixture were in homogeneous and clear solution status at this temperature. After that, 0.004 g Sn(Oct)$_2$ was added and the reaction was carried out at 80° C. and it was monitored by GPC. After 20 h, the signal of L-lactide disappeared, and then the reaction was quenched. The system was cooled to room temperature.

Step 6: the crude product obtained in step 5 was dissolved by CHCl$_3$ (20 mL) and the concentration was 100 g/L. Then, it was precipitated by 100 ml methanol. The product was filtered and vacuum dried, and the yield was 91.2%. GPC, FTIR, $^1$H-NMR, $^{13}$C-NMR and DSC analysis are applied on the final product. The results were as follows:

GPC: CHCl$_3$ as the mobile phase, flow rate of 1 ml min$^{-1}$ and polystyrene as the standards; the elution curve presented as normal distribution, and $M_n$=181.4K, $M_w$=286.6K, PDI=1.58;

¹H-NMR: the same as Example 24; there is no signal ascribed to transesterification reaction. The weight ratio was calculated from the integrals: $m_{poly\ (ethylene\ 1,4-naphthalate)}$:$m_{PLA}$=1:70;

¹³C-NMR: the same as Example 24; there is no signal ascribed to transesterification reaction.

DSC: the peak of $T_m$ (158° C.) was ascribed to the PLA block. The peak of $T_m$ (210° C.) was ascribed to the PLA stereocomplex formed by PLLA block and PDLA block; Because of the low content, there is no peak ascribed to the melting of poly (ethylene 1,4-naphthalate) block.

There is only a single peak in the GPC curve, and there is no peak of transesterification reaction in NMR Spectrum, which indicates that the product is the block copolymer.

It can be concluded from the above results that the product obtained in the present example was the block (B1-b-A1-b-B1) copolymer of poly (ethylene 1,4-naphthalate) and PLA, while the PLA block consisted of three different PLA block, and it is in B1-b-A1-b-B1 tri-block structure. $R_1$ was the structure of formula (13) in block A1, while $R_2$ was $(CH_2)_2$. Block B1 was consisted of three sorts of PLA block, which were PDLA block, PD,LLA block and PLLA block, ordered by the distance to A1.

Example 32

Synthesis of block copolymer of PBT and PLA, while the PLA block contained three different PLA type, the specific methods was as follows:

step 1 and step 2 are the same as example 11;

step 3: Polymerization of lactide initiated by dihydroxyl terminated copolymer synthesized at step 2.

Under $N_2$, the product obtained from step 2 (3 g) and D,L-lactide (20 g) were loaded into a 100 mL flask which was dried and de-oxygened and cooled under $N_2$. The mixed solvent of TCE and o-dichlorobenzene (V:V=1.10 mL) was charged into the flask by a syringe, and copolymer was 300 g/L and the concentration of D,L-lactide was 2 kg/L. Then, the mixture was heated to 140° C. and the mixture were in homogeneous and clear solution status at this temperature. After that, 0.23 g Sn(Oct)$_2$ was added and the reaction was carried out at 140° C. and it was monitored by GPC. After 5 h, the signal of D,L-lactide nearly disappeared, and then the reaction was quenched. The system was cooled to room temperature.

Step 4: the crude product was dissolved by CHCl$_3$ (300 mL) and the concentration was 75 g/L. Then, it was precipitated by 900 ml methanol. The product was filtered and vacuum dried.

Step 5: polymerization of lactide initiated by dihydroxyl terminated copolymer synthesized at step 4.

Under $N_2$, the product obtained from step 4 (1 g) and D-lactide (1 g) were loaded into a 100 mL flask which was dried and de-oxygened and cooled under $N_2$. The mixed solvent of TCE and o-dichlorobenzene (V:V=1.10 mL) was charged into the flask by a syringe, and the concentration of copolymer was 100 g/L and the concentration of D-lactide was 0.1 kg/L. Then, the mixture was heated to 50° C. and the mixture were in homogeneous and clear solution status at this temperature. After that, 0.02 g Sn(Oct)$_2$ was added and the reaction was carried out at 140° C. and it was monitored by GPC. After 2 h, the signal peak of D-lactide disappeared, and then the reaction was quenched. The system was cooled to room temperature.

Step 6: the crude product obtained in step 5 was dissolved by CHCl$_3$ (20 mL) and the concentration was 100 g/L. Then, it was precipitated by 100 ml methanol. The product was filtered and vacuum dried, and the yield was 97.1%.

GPC: CHCl$_3$ as the mobile phase, flow rate of 1 ml min⁻¹ and polystyrene as the standards; the elution curve presented as normal distribution, and $M_n$=70.1K, $M_w$=109.3K, PDI=1.56.

¹H-NMR: the same as Example 11; there is no signal ascribed to transesterification reaction. The weight ratio was calculated from the integrals: $m_{PBT}$:$m_{PLA}$=1:140;

¹³C-NMR: the same as Example 11; there is no signal ascribed to transesterification reaction. DSC: the peak of $T_m$ (160° C.) was ascribed to the PLA block; the peak of $T_m$ (210° C.) was ascribed to the PLA stereocomplex formed by PLLA block and PDLA block; Because of the low content, there is no peak ascribed to the melting of PBT block.

There is only a single peak in the GPC curve, and there is no peak of transesterification reaction in NMR Spectrum, which indicates that the product is the block copolymer.

It can be concluded from the above results that the product obtained in the present example was the block (B1-b-A1-b-B1) copolymer of PBT and PLA, while the PLA block consisted of three different PLA block, and it is in B1-b-A1-b-B1 tri-block structure. Wherein $R_1$ was the structure of formula (11) in block A1, $R_2$ was $(CH_2)_4$. Block B1 was consisted of three sorts of PLA block, which were PLLA block, PD,LLA block and PDLA block, ordered by the distance to A1.

Example 33

Synthesis of block copolymer of PET and PLA, while the PLA block contained three different PLA type, the specific methods was as follows:

Step 1 and step 2 were the same as example 13;

Step 3: Under $N_2$, the product obtained from step 2 (2 g) and L-lactide (1 g) were loaded into a 100 mL flask which was also dried and de-oxygened and cooled under $N_2$. The mixed solvent of TCE, o-dichlorobenzene and tetrahydrofuran (V:V:V=2:1:1, 10 mL) was charged into the flask by a syringe, and the concentration of copolymer was 200 g/L and the concentration of L-lactide was 0.1 kg/L. Then, the mixture was heated to 30° C. and the mixture were in homogeneous and clear solution status at this temperature. After that, 0.003 g SnBr$_2$ was added and the reaction was carried out at 50° C. and it was monitored by GPC. After 18 h, the signal peak of L-lactide disappeared, and then the reaction was quenched. The system was cooled to room temperature.

Step 4: the crude product was dissolved by CHCl$_3$ (60 mL) and the concentration was 50 g/L. Then, it was precipitated by 200 ml methanol. The product was filtered and vacuum dried.

Step 5: Polymerization of lactide initiated by dihydroxyl terminated copolymer synthesized at step 4.

Under $N_2$, the product obtained from step 4 (1 g) and D,L-lactide (1 g) were loaded into a to 100 mL flask which was dried and de-oxygened and cooled under $N_2$. The mixed solvent of dried TCE, o-dichlorobenzene and tetrahydrofuran (V:V:V=1.10 mL) was charged into the flask by a syringe, and the concentration of copolymer was 100 g/L and the concentration of D,L-lactide was 0.1 kg/L. Then, the mixture was heated to 40° C. and the mixture were in homogeneous and clear solution status at this temperature. After that, 0.002 g SnBr$_2$ was added and the reaction was carried out at 50° C. and it was monitored by GPC. After 2 h, the signal peak of D,L-lactide disappeared, and then the reaction was quenched. The system was cooled to room temperature.

Step 6: The crude product obtained in step 5 was dissolved by CHCl$_3$ (40 mL) and the concentration was 50 g/L. Then, it was precipitated by 200 ml methanol. The product was filtered and vacuum dried, and the yield was 97.2%. GPC, FTIR, $^1$H-NMR, $^{13}$C-NMR and DSC analysis are applied on the final product. The results were as follows:

GPC: CHCl$_3$ as the mobile phase, flow rate of 1 ml min$^{-1}$ and polystyrene as the standards; the elution curve presented as normal distribution, and $M_n$=35.1K, $M_w$=54.4K, PDI=1.55

$^1$H-NMR: the same as Example 13; there is no signal ascribed to transesterification reaction. The weight ratio was calculated from the integrals: $m_{PET}$:$m_{PLA}$=1:40;

$^{13}$C-NMR: the same as Example 13; there is no signal ascribed to transesterification reaction.

DSC: the peak of $T_m$ (175° C.) was ascribed to the PLA block. The peak of $T_m$ (210° C.) was ascribed to the PLA stereocomplex formed by PLLA block and PDLA block; Because of the low content, there is no peak ascribed to the melting of PET block.

There is only a single peak in the GPC curve, and there is no peak of transesterification reaction in NMR Spectrum, which indicates that the product is the block copolymer.

It can be concluded from the above results that the product obtained in the present example was the block (B1-b-A1-b-B1) copolymer of PBT and PLA, while the PLA block consisted of three different PLA block, and it is in B1-b-A1-b-B1 tri-block structure. $R_1$ was the structure of formula (11) in block A1, while $R_2$ was (CH$_2$)$_2$. Block B1 was consisted of three sorts of PLA block, which were PDLA block, PLLA block and PD,LLA block, ordered by the distance to A1.

Comparative Example 1

The synthesize of block copolymer of PBT and PLA by ring-opening polymerization of lactide initiated by dihydroxyl terminated PBT in the molten state. The specific method was as follows:

Step 1: Under N$_2$, the vacuum dried dihydroxyl terminated PBT (0.06 g) of which the water content was 20 ppm and the intrinsic viscosity was 0.12 dL/g, L-lactide (1.0 g) and Sn(Oct)$_2$ (0.0106 g) were loaded into a 50 mL flask which was dried and de-oxygened and cooled under N$_2$. The reaction was carried out at 230° C. in the molten state. After 10 minutes, the reaction was quenched. The system was cooled to room temperature. The color of crude product was brownish black.

Step 2: CHCl$_3$ (10 mL) was added to the flask and was precipitated by 40 ml methanol. The product was filtered and vacuum, and the yield was 60%. GPC, FTIR, $^1$H-NMR, $^{13}$C-NMR and DSC analysis are applied on the final product. The results were as follows:

GPC: CHCl$_3$ as the mobile phase, flow rate of 1 ml min$^{-1}$ and polystyrene as the standards. $M_n$=1.02K, $M_w$=1.83K, PDI=1.71;

$^1$H-NMR: 8.1 ppm (H in phenyl of PBT, 4.5 ppm (H in —O—CH$_2$—CH$_2$— of PBT), 2.0 ppm (H in —O—CH$_2$—CH$_2$CH$_2$— of PBT), 5.1 ppm (H in —O—CH(CH$_3$)O═C— of PLA), 1.6 ppm (H in —CH(CH$_3$)O═C— of PLA); the peak at 4.46 ppm and 1.85 ppm which was brought by the transesterification reaction, and their intensity was comparable to the peak at 4.5 ppm and 2.0 ppm;

$^{13}$C-NMR: 170.0 ppm (C in the C═O in the PLA), 69.2 ppm (C in methane —OCH(CH$_3$)—CO in PLA), 15.7 ppm (C in methyl-OCH(CH$_3$)—CO in PLA)); 167.0 ppm (C in the C═O in PBT), 133.2 ppm (C1, C4 in the phenyl of PBT), 129.3 ppm (C2, C3, C5, C6 in the phenyl of PBT)), 65.4 ppm (—O—CH$_2$—CH$_2$—CH$_2$—CH$_2$— in the methylene of PBT), 24.6 ppm (—O—CH$_2$—CH$_2$—CH$_2$—CH$_2$— in the methylene of PBT, the peak at 65.4 ppm and 24.6 ppm which was brought by the transesterification reaction, and their intensity was comparable to the peak at 65.4 ppm and 24.6 ppm;

DSC: there is only one peak, $T_m$ (200° C.);

It can be concluded from above results that transesterification phenomenon was apparent when the ringing-opening polymerization of lactide initiated by dihydroxyl terminated PBT was carried out in the molten state. The structure of copolymer was irregular. The yield and the molecular weight was low. Moreover, the degradation phenomenon was serious.

Comparative Example 2

The synthesize of block copolymer of PTT and PLA, by ring-opening polymerization of lactide initiated by dihydroxyl terminated PTT in the molten state. The specific method was as follows:

Step 1: Under N$_2$, the vacuum dried dihydroxyl terminated PTT (0.06 g) of which the water content was 15 ppm and the intrinsic viscosity was 0.04 dL/g, D-lactide (1.0 g) and SnCl$_2$ (0.0106 g) were loaded into a 50 mL flask which was dried and de-oxygened and cooled under N$_2$. The reaction was carried out at 230° C. in the molten state. After 20 minutes, then the reaction was quenched. The system was cooled to room temperature. The color of crude product was black.

Step 2: CHCl$_3$ (20 mL) was added to the flask to solve the black solid and was precipitated by addition to 100 ml methanol. The product was filtered and vacuum dried, and the yield was 40%. GPC, FTIR, $^1$H-NMR, $^{13}$C-NMR and DSC analysis are applied on the final product. The results were as follows:

GPC: CHCl$_3$ as the mobile phase, flow rate of 1 ml min$^{-1}$ and polystyrene as the standards. $M_n$=0.8 K, $M_w$=1.44 K, PDI=1.8;

$^1$H-NMR: 8.1 ppm (H in phenyl of PTT, 4.5 ppm (H in —O—CH$_2$—CH$_2$— of PTT), 2.0 ppm (H in —O—CH$_2$—CH$_2$CH$_2$—O— of PTT), 5.1 ppm (H in —O—CH(CH$_3$)O═C— of PLA), 1.6 ppm (H in —CH(CH$_3$)O═C— of PLA); the peak at 4.46 ppm and 1.85 ppm which was brought by the transesterification reaction, and their intensity was comparable to the peak at 4.5 ppm and 2.0 ppm;

$^{13}$C-NMR: 178.6 ppm (C in the C═O in the PLA), 69.2 ppm (C in methane —OCH(CH$_3$)—CO in PLA), 15.7 ppm (C in methyl-OCH(CH$_3$)—CO in PLA)); 168.6 ppm (C in the C═O in PTT), 133.2 ppm (C1, C4 in the phenyl of PTT), 129.4 ppm (C2, C3, C5, C6 in the phenyl of PTT)), 63.0 ppm (—O—CH$_2$—CH$_2$—CH$_2$—O— in the methylene of PTT), 26.8 ppm (—O—CH$_2$—CH$_2$—CH$_2$—O— in the methylene of PTT, the peak at 63.0 ppm and 25.8 ppm which was brought by the transesterification reaction, and their intensity was comparable to the peaks at 61.2 ppm and 27.2 ppm;

DSC: there is only one peak, $T_m$ (210° C.);

It can be concluded from above results that transesterification phenomenon was apparent when the ringing-opening polymerization of lactide initiated by dihydroxyl terminated PTT was carried out in the molten state. The structure of copolymer was irregular. The yield and the molecular weight was low. Moreover, the degradation phenomenon was serious.

Comparative Example 3

The block copolymer of PET and PLA, which was synthesized by ring-opening polymerization of lactide initiated by dihydroxyl terminated PET in the molten state. The specific method was as follows:

Step 1: Under N$_2$, the vacuum dried dihydroxyl terminated PET (0.06 g) of which the water content was 10 ppm and the intrinsic viscosity is 1.0 dL/g, D-lactide (1.0 g) and SnCl$_2$ (0.0106 g) were loaded into a 50 mL flask which was dried and de-oxygened and cooled under $N_2$. The reaction was carried out at 265° C. in the molten state. After 20 minutes, then the reaction was quenched. The system was cooled to room temperature. The color of crude product was black.

Step 2: $CHCl_3$ (20 mL) was added to the flask to solve the black solid and was precipitated by addition to 100 ml methanol. The product was filtered and vacuum dried to obtain crude product, and the yield was 10%. GPC, FTIR, $^1$H-NMR, $^{13}$C-NMR and DSC analysis are applied on the final product. The results were as follows:

GPC: $CHCl_3$ as the mobile phase, flow rate of 1 ml min$^{-1}$ and polystyrene as the standards. $M_n$=35.2K, $M_w$=67.23K, PDI=1.91;

$^1$H-NMR: 7.97 ppm (H in phenyl of PET, 4.78 ppm (H in —O—$CH_2$—$CH_2$—O— of PET) 5.42 ppm (H in —O—CH($CH_3$)O=C— of PLA), 1.68 ppm (H in —CH($CH_3$)O=C— of PLA); the peaks at 4.67 and 1.58 ppm which were brought by the transesterification reaction, and their intensity was comparable to the peak at 4.78 ppm;

$^{13}$C-NMR: 170.0 ppm (C in the C=O in the PLA), 69.2 ppm (C in methane —OCH($CH_3$)—CO in PLA), 15.7 ppm (C in methyl-OCH($CH_3$)—CO in PLA)); 168.4 ppm (C in the C=O in PET), 133.0 ppm (C1, C4 in the phenyl of PET), 129.5 ppm (C2, C3, C5, C6 in the phenyl of PET)), 63.6 ppm (—O—$CH_2$—$CH_2$—O— in the methylene of PET), the peaks at 73.8 ppm, 61.6 ppm, 14.7 ppm which were brought by the transesterification reaction, and their intensity was comparable to the peak at 63.6 ppm;

DSC: there is only one peak, $T_m$ (230° C.);

It can be concluded from above results that transesterification phenomenon was apparent when the ringing-opening polymerization of lactide initiated by dihydroxyl terminated PET was carried out in the molten state. The structure of copolymer was irregular. The yield and molecular weight was low. Moreover, the degradation phenomenon was serious.

Hereby illustrated the present invention in particular. The specific examples are employed to describe the principle and implementation method of the present invention. The above examples are only employed to help understand the way and the main idea of the present invention. It should be noticed that the technician can make improvement and modification to this invention without deviating the principle one of the present invention. And the improvement and modification is also within the protection of this invention.

What we claim is:

1. A polylactic acid block copolymer, which comprises block A and block B, and is presented as B-A-B tri-block structure, wherein block A has a structure of formula (I):

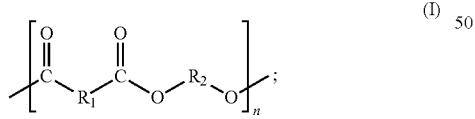

(I)

wherein $R_1$ is one or more selected from the group consisting of formula (11) to (15):

(11)

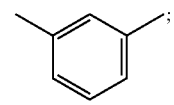

(12)

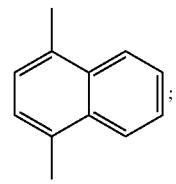

(13)

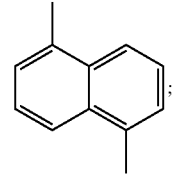

(14)

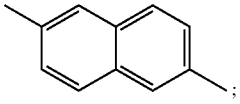

(15)

$R_2$ is one or more selected from the group consisting of $(CH_2)_2$, $(CH_2)_3$, $(CH_2)_4$, $(CH_2)_6$ and

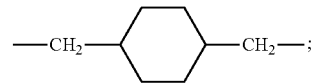

n is a natural number selected from 10-180;
and block B has a structure of formula (II):

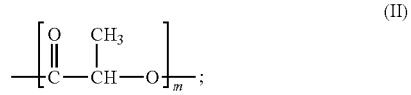

(II)

wherein m is a natural number selected from 30-3000;
a monomer for forming block B is L-lactide or D-lactide;
and the polylactic acid block copolymer has a regular structure indicated by two peak melting temperatures (Tm) corresponding to block A and block B, respectively;
wherein the polylactic acid block copolymer is prepared by a process comprising reacting an intermediate with a monomer lactide at 120° C.-150° C., the intermediate is an aromatic polyester oligomer containing a catalyst.

2. A polylactic acid block copolymer, which comprises block A1 and block B1, and is presented as B1-A1-B1 tri-block structure, wherein block A1 has a structure of formula (III):

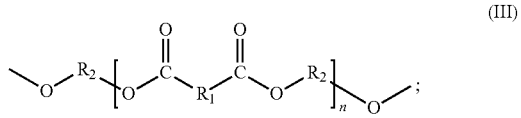

(III)

wherein $R_1$ is one or more selected from the group consisting of formula (11) to (15):

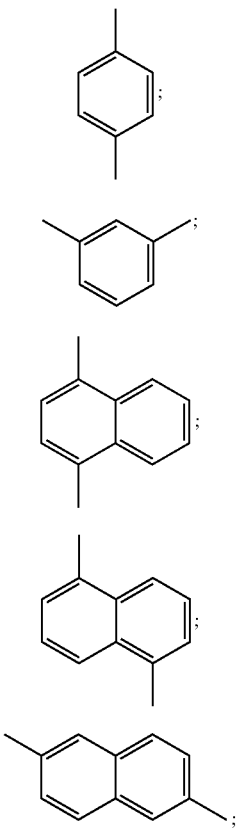

$R_2$ is one or more selected from the group consisting of $(CH_2)_2$, $(CH_2)_3$, $(CH_2)_4$, $(CH_2)_6$ and

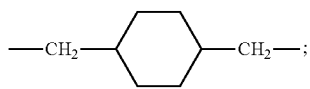

n is a natural number selected from 5-180;
and block B1 has a structure of formula (IV):

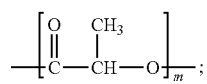

wherein m is a natural number selected from 30-3000;
wherein the polylactic acid block copolymer has a regular structure indicated by two peak melting temperatures (Tm) corresponding to block A1 and block B1, respectively; the polylactic acid block copolymer is prepared by a process comprising reacting a dihydroxyl terminated aromatic polyester with a monomer lactide at 60° C.-150° C.

3. The polylactic acid block copolymer according to claim 2, wherein m is a natural number selected from 50-2800.

4. The polylactic acid block copolymer according to claim 2, wherein a monomer forming block B1 is L-lactide or D-lactide.

5. A method for making polylactic acid block copolymer of claim 1, comprising the following steps:
Step (1): under $N_2$, an intermediate is obtained by reacting a cyclic aromatic polyester oligomer with 1,1,6,6-tetra-n-butyl-1,6-distanna-2,5,7,10-tetraoxacyclodecane in a first type of solvent; wherein the cyclic aromatic polyester oligomer is one or more selected from the group consisting of cyclic polyethylene terephthalate, cyclic poly ethylene isophathlate, cyclic poly ethylene 1,4-naphthalate, cyclic poly ethylene 1,5-naphthalate, cyclic poly ethylene naphthalate, cyclic poly butylene terephthalate, cyclic poly butylene isophathlate, cyclic poly butylene 1,4-naphthalate, cyclic poly butylene 1,5-naphthalate, cyclic poly butylene naphthalate, cyclic poly trimethylene terephthalate, cyclic poly trimethylene isophathlate, cyclic poly trimethylene 1,4-naphthalate, cyclic poly trimethylene 1,5-naphthalate, cyclic poly trimethylene naphthalate, cyclic poly 1,6-hexylene terephthalate, cyclic poly 1,6-hexylene isophathlate, cyclic poly 1,6-hexylene 1,4-naphthalate, cyclic poly 1,6-hexylene 1,5-naphthalate, cyclic poly 1,6-hexylene naphthalate, cyclic poly 1,4-cyclohexylene dimethylene terephthalate, cyclic poly 1,4-cyclohexylene dimethylene isophathlate, cyclic poly 1,4-cyclohexylene dimethylene 1,4-naphthalate, cyclic poly 1,4-cyclohexylene dimethylene 1,5-naphthalate and cyclic poly 1,4-cyclohexylene dimethylene 2,6-naphthalate;
Step (2): a crude product is obtained by reacting the intermediate obtained in step (1) with a monomer lactide in a second type of solvent at 120° C.-150° C.; wherein the monomer lactide is L-lactide or D-lactide; and
Step (3): the crude product obtained in step (2) is dissolved in a third type of solvent, and after precipitation using methanol, the polylactic acid block copolymer is obtained.

6. The method according to claim 5, wherein the step (1) consists:
under $N_2$, the cyclic aromatic polyester oligomer and 1,1,6,6-tetra-n-butyl-1,6-distanna-2,5,7,10-tetraoxacyclodecane are dissolved in the first type of solvent which has high boiling-point and is dehydrated and de-oxygened; the reaction is performed at 120° C.-180° C.; during the process, the reaction is monitored using Gel Permeation Chromatograph; the reaction is quenched after the signal peak for cyclic oligomer disappears; after the reaction is completed, the reaction mixture is cooled to room temperature, and the intermediate is obtained through filtration;
the step (2) comprises:
the intermediate product obtained in step (1) and the monomer lactide are dissolved in the second type of solvent which has high boiling-point and is dehydrated and de-oxygened, wherein the concentration of the intermediate product is less than or equal to 100 g/L, and the concentration of the monomer lactide is less than or equal to 1 kg/L; during the process, the reaction is monitored by Gel Permeation Chromatograph; the reaction is quenched after the signal peak of monomer lactide disappears; after the reaction is completed, the reaction mixture is cooled to room temperature, and filtered, thus obtaining the crude product; and
the step (3) comprises:
the crude product obtained in step (2) is dissolved in the third type of solvent, wherein the concentration of the crude product is 50-200 g/L; and the crude product is precipitated using methanol, the volume of which is 3-5 times of the third type of solvent, and then the precipitate is filtered and dried in an oven to obtain polylactic acid block copolymer.

7. The method according to claim 6, wherein the first type of solvent in step (1) is one or more selected from the group consisting of o-dichlorobenzene, chlorobenzene, 1,2,4-trichlorobenzene and tetrachloroethane.

8. The method according to claim 6, wherein the second type of solvent in step (2) is one or two selected from o-dichlorobenzene and tetrachloroethane.

9. A method for making polylactic acid block copolymer of claim 2, comprising the following steps:

Step a): in the presence of tin salt catalyst, a first type of crude product is obtained by reacting a dihydroxyl terminated aromatic polyester with a first type of monomer lactide in a first type of organic solvent at 60° C.-150° C.; wherein said dihydroxyl terminated aromatic polyester has a structure of formula (V):

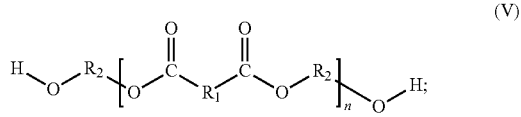

(V)

wherein $R_1$ is one or more selected from the group consisting of formula (11) to (15):

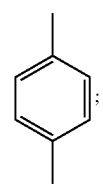

(11)

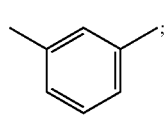

(12)

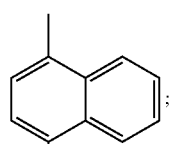

(13)

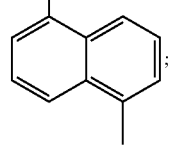

(14)

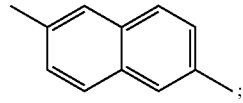

(15)

$R_2$ is one or more selected from the group consisting of $(CH_2)_2$, $(CH_2)_3$, $(CH_2)_4$, $(CH_2)_6$ and

n is a natural number;

step b): the first type of crude product obtained in step a) is dissolved in a second type of organic solvent, and the product is precipitated using methanol, thus obtaining polylactic acid block copolymer containing polylactic acid with single configuration.

10. The method according to claim 9, wherein the method further comprises:

step c): in the presence of tin salt catalyst, a second type of crude product is obtained by reacting the polylactic acid block copolymer obtained in step b) with a second type of monomer lactide in a third type of organic solvent, wherein the second type of monomer lactide is different from the first type of monomer lactide;

step d): the second type of crude product obtained in step c) is dissolved in chloroform, and the product is precipitated by using methanol, thus obtaining polylactic acid block copolymer containing polylactic acid with two types of configurations.

11. The method according to claim 10, wherein the method further comprises:

step e): in the presence of tin salt catalyst, a third type of crude product is obtained by reacting the polylactic acid block copolymer obtained in step d) with a third type of monomer lactide in a third type of organic solvent, wherein the third type of monomer lactide is different from the first type of monomer lactide and the second type of monomer lactide;

step f): the third type of crude product obtained in step e) is dissolved in chloroform, and the product is precipitated by using methanol, thus obtaining polylactic acid block copolymer containing polylactic acid block with three types of configurations.

12. The method according to claim 11, wherein step a) comprises:

the dihydroxyl terminated aromatic polyester is dried under vacuum, thus making the water content thereof less than or equal to 20 ppm; at 60° C.-130° C., the dried dihydroxyl terminated aromatic polyester and the first type of monomer lactide are dissolved in the first type of organic solvent which is dehydrated and de-oxygened; and tin salt catalyst is added; the reaction is monitored by Gel Permeation Chromatograph; the reaction is quenched after the signal peak of the first type of monomer lactide disappears; the reaction mixture is cooled to room temperature, and filtered to obtain the first type of crude product;

step b) comprises:

the first type of crude product obtained in step a) is dissolved in the second type of organic solvent, and is precipitated using methanol, the volume of which is 3-5 times of the second type of organic solvent, and is filtered and dried in an oven to obtain polylactic acid block copolymer with polylactic acid block of single configuration;

step c) comprises:

at 30° C.-140° C., the polylactic acid block copolymer obtained in step b) and the second type of monomer lactide is dissolved in the third type of organic solvent which is dehydrated and de-oxygened; tin salt catalyst is added; the reaction is monitored by gel permeation chromatograph; the reaction is quenched after the signal peak of the second type of monomer lactide disappears; the reaction mixture is cooled to room temperature, and filtered to obtain the second type of crude product;

step d) comprises:

the second type of crude product obtained in step c) is dissolved in chloroform, wherein the concentration of the second type of crude product is 50 g/L-100 g/L, and the product is precipitated by using methanol, the volume of which is 3-5 times of chloroform, and then the product is filtered and dried in an oven, thus obtaining polylactic acid block copolymer with polylactic acid of the two types of configurations;

step e) comprises:
at 30° C.-140° C., the polylactic acid block copolymer obtained in step d) and the third type of monomer lactide are dissolved in the third type of organic solvent dehydrated and de-oxygened; and tin salt catalyst is added to conduct the reaction; the reaction is monitored by Gel Permeation Chromatograph, and quenched after the signal peak of the third type of lactide disappears; the reaction mixture is cooled to room temperature, and filtered to obtain the third type of crude product;

step f) comprises:
the third type of crude product obtained in step e) is dissolved in chloroform, wherein the concentration of the third type of crude product is 50 g/L-100 g/L; and the product is precipitated by using methanol, the volume of which is 3-5 times of chloroform, and filtered and dried in an oven, thus obtaining polylactic acid block copolymer with polylactic acid of the three types of configurations.

13. The method according to claim 12, wherein the first type of monomer lactide is selected from the group consisting of L-lactide, D-lactide and D,L-lactide; the second type of monomer lactide is selected from the group consisting of L-lactide, D-lactide and D,L-lactide; and the third type of monomer lactide is selected from the group consisting of L-lactide, D-lactide and D,L-lactide.

14. The method according to claim 12, wherein the tin salt catalyst in step a) is $Sn(Oct)_2$, $SnCl_2$, $SnCl_4$, or $SnBr_2$; the tin salt catalyst in step c) is $Sn(Oct)_2$, $SnCl_2$, $SnCl_4$, or $SnBr_2$; the tin salt catalyst in step e) is $Sn(Oct)_2$, $SnCl_2$, $SnCl_4$, or $SnBr_2$.

15. The method according to claim 12, wherein the first type of organic solvent in step a) is one or more selected from the group consisting of o-dichlorobenzene, tetrachloroethane, nitrobenzene and 1,2,4-trichlorobenzene.

16. The method according to claim 12, wherein the second type of organic solvent in step b) is one or two selected from the group consisting of chloroform and trifluoroacetic acid; the third type of organic solvent in step c) is one or more selected from the group consisting of dichloromethane, chloroform, tetrachloromethane, toluene, tetrahydrofuran, o-dichlorobenzene, and tetrachloroethane; and the third type of organic solvent in step e) is one or more selected from the group consisting of dichloromethane, chloroform, tetrachloromethane, toluene, tetrahydrofuran, o-dichlorobenzene, and tetrachloroethane.

17. The polylactic acid block copolymer of claim 1, which is produced by a solvent-based method comprising the following steps:

Step (1): under $N_2$, the intermediate is obtained by reacting a cyclic aromatic polyester oligomer with 1,1,6,6-tetra-n-butyl-1,6-distanna-2,5,7,10-tetraoxacyclodecane in a first solvent; wherein the cyclic aromatic polyester oligomer is one or more selected from the group consisting of cyclic polyethylene terephthalate, cyclic poly ethylene isophathlate, cyclic poly ethylene 1,4-naphthalate, cyclic poly ethylene 1,5-naphthalate, cyclic poly ethylene naphthalate, cyclic poly butylene terephthalate, cyclic poly butylene isophathlate, cyclic poly butylene 1,4-naphthalate, cyclic poly butylene 1,5-naphthalate, cyclic poly butylene naphthalate, cyclic poly trimethylene terephthalate, cyclic poly trimethylene isophathlate, cyclic poly trimethylene 1,4-naphthalate, cyclic poly trimethylene 1,5-naphthalate, cyclic poly trimethylene naphthalate, cyclic poly 1,6-hexylene terephthalate, cyclic poly 1,6-hexylene isophathlate, cyclic poly 1,6-hexylene 1,4-naphthalate, cyclic poly 1,6-hexylene 1,5-naphthalate, cyclic poly 1,6-hexylene naphthalate, cyclic poly 1,4-cyclohexylene dimethylene terephthalate, cyclic poly 1,4-cyclohexylene dimethylene isophathlate, cyclic poly 1,4-cyclohexylene dimethylene 1,4-naphthalate, cyclic poly 1,4-cyclohexylene dimethylene 1,5-naphthalate and cyclic poly 1,4-cyclohexylene dimethylene 2,6-naphthalate;

Step (2): a crude product is obtained by reacting the intermediate obtained in step (1) with the monomer lactide in a second solvent; wherein the monomer lactide is L-lactide or D-lactide; and Step (3): the crude product obtained in step (2) is dissolved in a third solvent, and after precipitation using methanol, the polylactic acid block copolymer is obtained.

18. The polylactic acid block copolymer of claim 1, wherein the block B is optically active.

19. The polylactic acid block copolymer of claim 2, which is produced by a solvent-based method comprising the following steps:

Step a): in the presence of tin salt catalyst, a first crude product is obtained by reacting the dihydroxyl terminated aromatic polyester with the monomer lactide in a first organic solvent; wherein the dihydroxyl terminated aromatic polyester has a structure of formula (V):

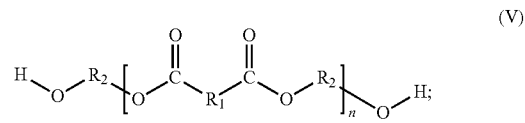

(V)

wherein $R_1$ is one or more selected from the group consisting of formula (11) to (15):

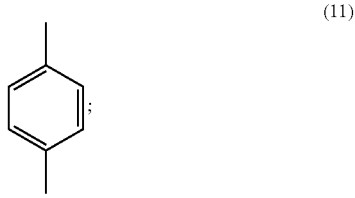

(11)

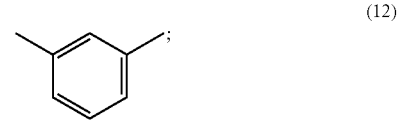

(12)

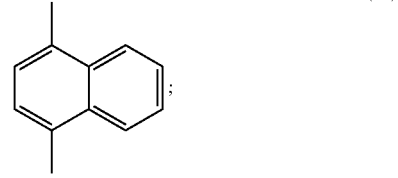

(13)

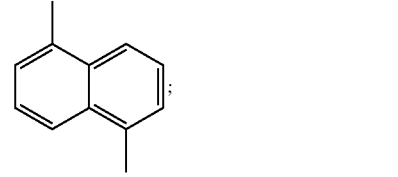

(14)

-continued

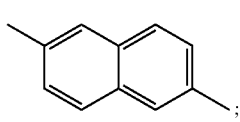 (15)

$R_2$ is one or more selected from the group consisting of $(CH_2)_2$, $(CH_2)_3$, $(CH_2)_4$, $(CH_2)_6$ and

;

n is a natural number selected from 5-180;

step b): the first crude product obtained in step a) is dissolved in a second organic solvent, and the product is precipitated using methanol, thus obtaining polylactic acid block copolymer containing polylactic acid with single configuration.

20. The polylactic acid block copolymer of claim 2, wherein the block B1 is optically active.

* * * * *